(12) United States Patent
Horita

(10) Patent No.: US 9,937,707 B2
(45) Date of Patent: Apr. 10, 2018

(54) METHOD OF PRESENTING MEASUREMENT POSITION, METHOD OF MANUFACTURING MEASUREMENT POSITION PRESENTATION GUIDE, METHOD OF MEASURING PRINT MATERIAL, METHOD OF DETERMINING MEASUREMENT POSITION OF PRINT MATERIAL, AND DEVICE FOR DETERMINING MEASUREMENT POSITION OF PRINT MATERIAL

(71) Applicant: FUJIFILM Corporation, Tokyo (JP)

(72) Inventor: Shuhei Horita, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/460,048

(22) Filed: Mar. 15, 2017

(65) Prior Publication Data
US 2017/0182762 A1    Jun. 29, 2017

Related U.S. Application Data

(63) Continuation of application No. PCT/JP2015/074471, filed on Aug. 28, 2015.

(30) Foreign Application Priority Data

Sep. 26, 2014 (JP) .................................. 2014-197281
Sep. 26, 2014 (JP) .................................. 2014-197284

(51) Int. Cl.
*G06K 9/00* (2006.01)
*B41F 33/00* (2006.01)
(Continued)

(52) U.S. Cl.
CPC .......... *B41F 33/0036* (2013.01); *G01B 11/14* (2013.01); *G01B 11/27* (2013.01); *G01J 3/46* (2013.01)

(58) Field of Classification Search
CPC ..... B41F 33/0036; G01B 11/14; G01B 11/27; G01J 3/46
See application file for complete search history.

(56) References Cited

U.S. PATENT DOCUMENTS 3,938,896 A * 2/1976 Selgin ....................... G01J 3/50
356/230
4,505,589 A * 3/1985 Ott ....................... B41F 33/0036
250/226
(Continued)

FOREIGN PATENT DOCUMENTS

JP    H06-016833 U    3/1994
JP    H08-058072 A    3/1996
(Continued)

OTHER PUBLICATIONS

Japanese Office Action in Japanese Application No. 2014-197281 dated Jun. 22, 2017 with an English translation thereof.
(Continued)

*Primary Examiner* — Jonathan S Lee
(74) *Attorney, Agent, or Firm* — McGinn IP Law Group, PLLC

(57) ABSTRACT

A measurement position presentation guide indicating a measurement position of the print material is generated on the basis of the print image data. To achieve the second object, print image data is analyzed to extract a plurality of measurement candidate regions that are candidates of a measurement position. The number of measurement positions to be allocated to each of a plurality of measurement candidate region groups of which image signal values are different is determined. The measurement candidate region
(Continued)

group of which the image signal value is within a predetermined range with respect to the measurement candidate region group to which the measurement position has been allocated is excluded from targets of allocation of the measurement position.

19 Claims, 26 Drawing Sheets

(51) Int. Cl.
*G01B 11/27* (2006.01)
*G01B 11/14* (2006.01)
*G01J 3/46* (2006.01)

(56) References Cited

U.S. PATENT DOCUMENTS

| | | | |
|---|---|---|---|
| 4,901,254 A | 2/1990 | Dolezalek et al. | |
| 4,949,284 A * | 8/1990 | Watanabe | B41F 33/0036 101/365 |
| 5,764,386 A * | 6/1998 | Robinson | H04N 1/6033 348/181 |
| 6,437,876 B1 * | 8/2002 | Phang | G06K 15/00 358/1.2 |
| 9,194,746 B1 * | 11/2015 | Reda | G01J 3/465 |
| 2006/0045312 A1 * | 3/2006 | Bernstein | A63B 24/0003 382/103 |
| 2007/0227389 A1 * | 10/2007 | Huber | B41F 33/0036 101/484 |
| 2015/0040785 A1 * | 2/2015 | Turke | B41F 33/0036 101/171 |
| 2016/0263915 A1 * | 9/2016 | Verdugo | B41J 11/009 |

FOREIGN PATENT DOCUMENTS

| | | |
|---|---|---|
| JP | H10-305562 A | 11/1998 |
| JP | 2001-311665 A | 11/2001 |
| JP | 2006-153864 A | 6/2006 |
| JP | 2008-044177 A | 2/2008 |
| JP | 2011-075304 A | 4/2011 |
| JP | 2012-165296 A | 8/2012 |
| JP | 5438944 B2 | 3/2014 |
| JP | 2014-516318 A | 7/2014 |

OTHER PUBLICATIONS

International Search Report (ISR) (PCT Form PCT/ISA/210), in PCT/JP2015/074471, dated Nov. 10, 2015.
Written Opinion of the ISA/JPO (PCT/ISA/237) in PCT/JP2015/074471, dated Nov. 10, 2015 and English translation thereof.

* cited by examiner

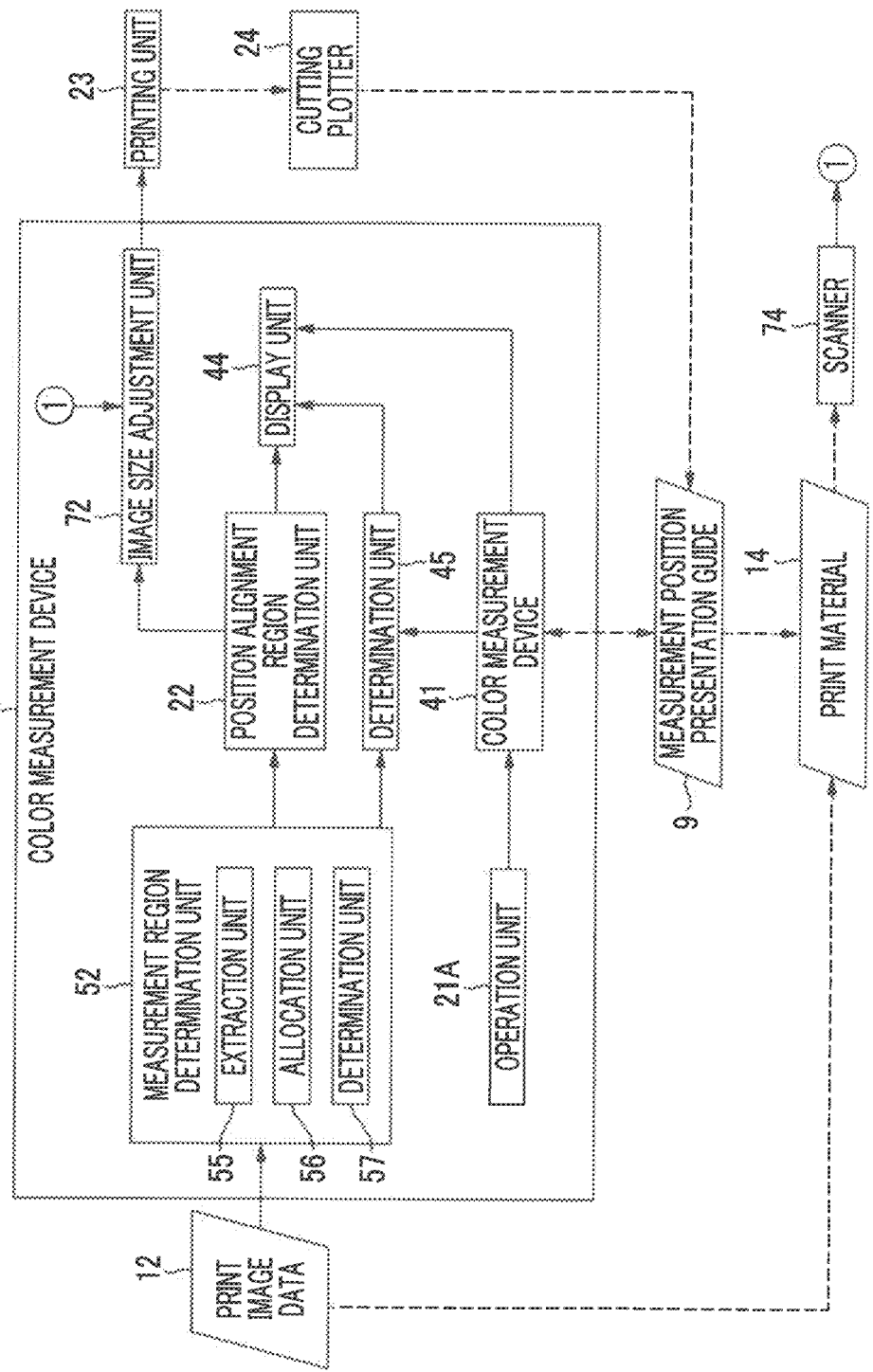

ically made by a special examiner. Since this determination is subjective and visual criteria are different according to examiners, an objective determination is difficult. Therefore, a color variation inevitably occurs in a large amount of printed print material, and in a case where this variation is large, complaints may be received from customers and a situation of re-printing may be caused.

METHOD OF PRESENTING MEASUREMENT POSITION, METHOD OF MANUFACTURING MEASUREMENT POSITION PRESENTATION GUIDE, METHOD OF MEASURING PRINT MATERIAL, METHOD OF DETERMINING MEASUREMENT POSITION OF PRINT MATERIAL, AND DEVICE FOR DETERMINING MEASUREMENT POSITION OF PRINT MATERIAL

CROSS-REFERENCE TO RELATED APPLICATIONS

This application is a Continuation of PCT International Application No. PCT/JP2015/074471 filed on Aug. 28, 2015, which claims priority under 35 U.S.C. § 119(a) to Japanese Patent Applications No. 2014-197281 filed on Sep. 26, 2014 and No. 2014-197284 filed on Sep. 26, 2014. Each of the above applications is hereby expressly incorporated by reference, in their entirety, into the present application.

BACKGROUND OF THE INVENTION

1. Field of the Invention

The present invention relates to a method of presenting a measurement position for measuring quality of a print material, a method of manufacturing a measurement position presentation guide, a method of measuring a print material, a method of determining a measurement position of a print material, and a device for determining a measurement position of a print material.

2. Description of the Related Art

In the related art, a determination as to whether or not a print material has been obtained with predetermined color (including concentration of the color) that is designated by a customer has been visually made by a special examiner. Since this determination is subjective and visual criteria are different according to examiners, an objective determination is difficult. Therefore, a color variation inevitably occurs in a large amount of printed print material, and in a case where this variation is large, complaints may be received from customers and a situation of re-printing may be caused.

Therefore, in recent years, it is common to objectively evaluate color of a print material using a color measurement device, such as to cause the color measurement device to come in contact with the print material manually through visual observation and execute color measurement.

For example, JP2006-153864A discloses a method of evaluating color deviation between print materials by measuring color at the same points of two print materials using a color measurement device. In the method described in JP2006-153864A, measurement points at which color measurement is performed are manually selected, or a logo of a corporate, a face of a person, other important areas, or the like are automatically selected as measurement points, and color measurement of the selected measurement points is executed for two print materials.

JP10-305562A discloses an evaluation device that evaluates color deviation between print materials by measuring color at the same points of two print materials using a color measurement device, as in JP2006-153864A described above. The evaluation device of JP10-305562A includes a manuscript table, an XY arm attached to the manuscript table and movable in a horizontal direction (X-direction) and a vertical direction (Y-direction), and a color measurement device attached to the XY arm, and designates a specific place on the print material with coordinates (X, Y) and can perform color measurement.

Japanese Patent No. 5438944 discloses a concentration calculation device that automatically selects a color of interest for which color measurement is performed on the basis of print image data and displays the color on a display screen. The concentration calculation device of Japanese Patent No. 5438944 analyzes the print image data and selects the color of interest according to a priority imparted in a descending order of an area of an image portion having color of interest. Usually, important color often occupies a large area on a printed image based on the print image data. Therefore, according to the concentration calculation device of Japanese Patent No. 5438944, since a priority is automatically imparted according to an area of each color on a printed image, color measurement can be performed even when a person does not have skilled knowledge on printing.

JP2012-165296A discloses an image forming device that divides print image data into a plurality of partial regions, calculates a degree of flatness of pixel values in each region for each partial region, and selects a region with a high degree of flatness as a color measurement adaptation region suitable for color measurement. According to the image forming device of JP2012-165296A, since the region with a high degree of flatness of pixel values in the print image data is selected as the color measurement adaptation region, it is possible to perform color measurement on the region with a high degree of flatness of pixel values even when a person does not have skilled knowledge on printing.

SUMMARY OF THE INVENTION

However, in a method described in JP2006-153864A, for example, in a case where a region with the same color (the same image signal value) spreads in an image printed on a print material, color measurement values may be different according to the measurement position in this region due to unevenness of printing. Further, even in a case where color measurement for a gradation region in which color continuously changes in an image is performed, color measurement values may differ according to the measurement position in this region. Therefore, an appropriate position and the number of points at which the color measurement is performed are unclear.

Further, the evaluation device described in JP10-305562A is a special device capable of designating a specific place on the print material with coordinates (X, Y) and measuring the place, but it is necessary for new facility investment or installation site to be secure so as to prepare such a special device. Therefore, in reality, it is difficult to prepare the evaluation device described in JP10-305562A.

Meanwhile, if there is a large number of regions having color of interest of which pixel signals values are similar in a case where selection of the color of interest for which color measurement is performed is performed according to an area proportion of the color of interest as in the concentration calculation device described in Japanese Patent No. 5438944, the number of selections of regions having a low area proportion, but having an important color is reduced or is not be selected. That is, significant imbalance may occur in the number of selections of the colors of interest in which image signal values are different (not similar).

Further, in the image forming device described in JP2012-165296A, in a case where the region with a high degree of flatness of the pixel value is selected as the color measurement adaptation region and there are a large number of color measurement adaptation regions of which image signal values are similar, the number of selections of the color measurement adaptation regions having a low area proportion, but having an important color may be reduced or may not be selected. Therefore, a significant imbalance may occur in the number of selections of the color measurement adaptation regions in which image signal values are different from one another (are not similar).

The present invention has been made in view of such circumstances, and a first object of the present invention is to provide a method of presenting a measurement position, a method of manufacturing a measurement position presentation guide, and a method of measuring a print material capable of easily presenting a measurement position on a print material, and a second object of the present invention is to provide is to provide a method of determining a measurement position of a print material, a device for determining a measurement position of a print material, and a method of measuring a print material capable of appropriately determining a measurement position on a print material.

A method of presenting a measurement position for achieving a first object of the present invention comprises a determination step of determining a measurement position for measuring quality of a print material on which an image based on print image data is printed, in advance; a generation step of generating a measurement position presentation guide indicating a measurement position of the print material on the basis of the print image data; and a presentation step of arranging the measurement position presentation guide on the print material and presenting the measurement position. Here, "arranging on the print material" in this disclosure indicates arranging on a surface for measuring quality of the print material.

According to the present invention, it is possible to present the measurement positions on the print material using the measurement position presentation guide, and to easily measure the measurement positions on the print material. Further, it is possible to perform measurement with good reproducibility of the measurement positions on the print material.

A method of manufacturing a measurement position presentation guide for achieving the first object of the present invention comprises a determination step of determining a measurement position for measuring quality of a print material on which an image based on print image data is printed, in advance; and a generation step of generating a measurement position presentation guide indicating a measurement position of the print material on the basis of the print image data.

In the method of manufacturing a measurement position presentation guide according to another aspect of the present invention, the generation step includes generating the measurement position presentation guide including a printing surface on which the image is printed and a measurement region formed on the printing surface and indicating a measurement position. Accordingly, it is possible to easily perform presentation of the measurement position on the print material.

In the method of manufacturing a measurement position presentation guide according to still another aspect of the present invention, the generation step includes performing an process capable of specifying the measurement region on the print image data, and printing the processed print image data to generate the measurement position presentation guide. Accordingly, it is possible to easily perform presentation of the measurement position on the print material.

In the method of manufacturing a measurement position presentation guide according to still another aspect of the present invention, the generation step includes performing a process of cutting out a portion corresponding to the measurement region of the measurement position presentation guide. Accordingly, it is possible to present the measurement position on the print material through an aperture portion of the measurement position presentation guide subjected to a cutout process.

In the method of manufacturing a measurement position presentation guide according to still another aspect of the present invention, the generation step includes forming position information indicating a position of the measurement region, on the printing surface. It is possible to easily determine the position of the measurement region on the measurement position presentation guide.

In the method of manufacturing a measurement position presentation guide according to still another aspect of the present invention, the generation step includes forming a position alignment region to be used for position alignment between the image of the print material and the image of the measurement position presentation guide, in the measurement position presentation guide. Accordingly, it is possible to easily perform position alignment between the image of the print material and the image of the measurement position presentation guide.

In the method of manufacturing a measurement position presentation guide according to still another aspect of the present invention, the generation step includes performing a process of cutting out a portion corresponding to the position alignment region of the measurement position presentation guide. Accordingly, it is possible to easily perform position alignment between the image of the print material and the image of the measurement position presentation guide.

In the method of manufacturing a measurement position presentation guide according to still another aspect of the present invention, the generation step includes setting a region of a portion of an edge of the image as the position alignment region. Accordingly, it is possible to easily perform position alignment between the image of the print material and the image of the measurement position presentation guide.

In the method of manufacturing a measurement position presentation guide according to still another aspect of the present invention, the generation step includes setting regions of portions of edges of the image, the regions being a plurality of regions in which directions of edges are different from one another, as the position alignment regions. Accordingly, it is possible to improve the position alignment accuracy when position alignment is performed between the image of the print material and the image of the measurement position presentation guide.

In the method of manufacturing a measurement position presentation guide according to still another aspect of the present invention, the generation step includes generating the measurement position presentation guide having optical transmittance. Accordingly, it is possible to easily perform presentation of the measurement position on the print material.

In the method of manufacturing a measurement position presentation guide according to still another aspect of the present invention, the generation step includes forming an edge image obtained by extracting an edge of the image, on the printing surface. Accordingly, it is possible to easily perform position alignment between the image of the print material and the image of the measurement position presentation guide.

In the method of manufacturing a measurement position presentation guide according to still another aspect of the present invention, the generation step includes comparing a size of the image of the print image data with a size of the image printed on the print material on the basis of the print image data to calculate a scaling factor of the size of the image printed on the print material to the size of the image of the print image data, performing a scaling process of scaling the size of the image on the print image data on the basis of the scaling factor, and performing printing on the printing surface of the measurement position presentation guide on the basis of the print image data subjected to the scaling process. Accordingly, a measurement position presentation guide on which an image having a size corresponding to the size of the image on the print material has been printed is obtained.

The method of manufacturing a measurement position presentation guide according to still another aspect of the present invention further comprises: a candidate region extraction step of analyzing the print image data to extract the plurality of measurement candidate regions that are candidates of the measurement position, image signal values in the plurality of measurement candidate regions being equal individually for the respective regions, in which the determination step includes determining the measurement position from among the plurality of measurement candidate regions extracted in the measurement candidate region extraction step. Thus, it is possible automatically determine the measurement position. Accordingly, it is possible to perform measurement in consideration of unevenness of printing when measurement of the print material is performed.

In a method of manufacturing a measurement position presentation guide according to still another aspect of the present invention, in a case where a group of the measurement candidate regions of which the image signal values are equal is defined as one measurement candidate region group, the determination step includes determining the number of measurement positions to be allocated to the respective measurement candidate region groups according to an area proportion of each measurement candidate region group of which the image signal values are different, and determining the position of the measurement candidate region corresponding to the number to be allocated to each measurement candidate region group as the measurement position. Thus, it is possible to automatically determine the measurement position according to the area proportion of each measurement candidate region.

The method of manufacturing a measurement position presentation guide according to still another aspect of the present invention further comprises: a candidate region extraction step of analyzing the print image data to extract the plurality of measurement candidate regions that are candidates of the measurement position, image signal values in the plurality of measurement candidate regions being equal individually for the respective regions; and an allocation step of comparing magnitudes of area proportions of the respective measurement candidate regions of which the image signal values are different on the basis of a result of the extraction in the measurement candidate region extraction step to determine the number of measurement positions to be allocated to the respective measurement candidate region groups in an order of the magnitudes of the area proportions in a case where a group of the measurement candidate regions of which the image signal values are equal is defined as one measurement candidate region group, in which the allocation step includes excluding the measurement candidate region group of which the image signal value is within a predetermined range with respect to the image signal value of the measurement candidate region group to which the measurement position has been allocated, from targets of allocation of the measurement position, and the determination step includes determining the position of the measurement candidate region corresponding to the number of allocations to each measurement candidate region group in the allocation step, as the measurement position. Thus, even in a case where there are a large number of measurement candidate regions of which image signal values are similar, the image signal values of the measurement positions are dispersed while allocating the measurement positions to each measurement candidate region with weights according to the area proportion.

In the method of manufacturing a measurement position presentation guide according to still another aspect of the present invention, the determination step includes dispersing measurement positions in the measurement candidate region group when a plurality of measurement positions are determined in the measurement candidate region group. Accordingly, even when there is unevenness in a surface of the print material, it is possible to acquire a measurement value by averaging an influence of unevenness.

In the method of manufacturing a measurement position presentation guide according to still another aspect of the present invention, the determination step includes increasing dispersion of the measurement positions in a predetermined direction in the print material than that in other directions when the measurement positions are dispersed. Accordingly, even when there is unevenness in a surface of the print material, it is possible to acquire a measurement value by averaging an influence of unevenness.

In the method of manufacturing a measurement position presentation guide according to still another aspect of the present invention, the measurement of the quality of the print material includes at least one of color measurement of the print material, measurement of a halftone dot area rate of the image printed on the print material, measurement of a degree of glossiness of the print material, or measurement of a bidirectional reflectance distribution function of the print material.

A method of measuring a print material for achieving the first object of the present invention comprises: an arrangement step of arranging a measurement position presentation guide manufactured using the method of manufacturing the measurement position presentation guide described above, on the print material; and a measurement step of measuring quality of the print material at the measurement position indicated by the measurement position presentation guide.

The method of measuring a print material according to still another aspect of the present invention further comprises: comparing an image signal value obtained from the print image data with a result of the measurement obtained in the measurement step to determine whether the measurement in the measurement step has been correctly performed. Thus, it is possible to perform warning to indicate that the measurement in the measurement step is not correctly performed when the measurement in the measurement step is not correctly performed, and as a result, it is possible to prompt re-measurement.

A method of determining a measurement position of a print material for achieving the second object of the present invention further comprises: a candidate region extraction step of analyzing the print image data of the image to be printed on the print material to extract a plurality of measurement candidate regions that are candidates of the measurement position for measuring quality of the print material, image signal values in the plurality of measurement candidate regions being equal individually for the respective regions; an allocation step of determining, for each measurement candidate region group, the number of measurement positions to be allocated to each of the plurality of measurement candidate region groups of which image signal values are different on the basis of a result of the extraction in the measurement candidate region extraction step in a case where a group of the measurement candidate regions having the same image signal value is defined as one measurement candidate region group; and a determination step of determining the position of the measurement candidate region corresponding to the number of allocations to each measurement candidate region group in the allocation step, as the measurement position, in which the allocation step includes excluding the measurement candidate region group of which the image signal value is within a predetermined range with respect to the image signal value of the measurement candidate region group to which the measurement position has been allocated, from targets of allocation of the measurement position.

According to the present invention, in a case where there are a large number of measurement candidate region groups of which image signal values are similar to one another, significant imbalance is prevented from occurring in the number of measurement positions to be allocated to each measurement candidate region group of which image signal values are different (not similar). As a result, it is possible to appropriately determine the measurement positions on the print material.

In the method of determining the measurement position of a print material according to still another aspect of the present invention, the allocation step includes comparing magnitudes of area proportions that are percentages in the print image data for each measurement candidate region group on the basis of a result of the extraction in the candidate region extraction step to determine the number of measurement positions to be allocated to the respective measurement candidate region groups in an order of the magnitudes of the area proportions. Accordingly, even in a case where there are a large number of measurement candidate region groups of which image signal values are similar, the image signal value of the measurement position is dispersed while allocating the measurement positions to each measurement candidate region group with a weight according to the area proportion. As a result, it is possible to prevent for the number of selections of the regions having a low area proportion, but having an important color in the printed image as the measurement position from being reduced or from being not selected.

In the method of determining a measurement position of a print material according to still another aspect of the present invention, the allocation step includes increasing the number of measurement positions to be allocated as the area proportion of the measurement candidate region group increases. Accordingly, even in a case where there are a large number of measurement candidate region groups of which image signal values are similar, it is possible to allocate the measurement positions to each measurement candidate region group with a weight according to the area proportion.

In the method of determining a measurement position of a print material according to still another aspect of the present invention, the determination step includes dispersing measurement positions in the measurement candidate region group when a plurality of measurement positions are determined in the measurement candidate region group. Accordingly, even when there is unevenness in a surface of the print material, it is possible to acquire a measurement value by averaging an influence of unevenness.

In the method of determining a measurement position of a print material according to still another aspect of the present invention, the determination step includes increasing dispersion of the measurement positions in a predetermined direction in the print material than that in other directions when the measurement positions are dispersed. Accordingly, even when there is unevenness in a surface of the print material, it is possible to acquire a measurement value by averaging an influence of unevenness.

In the method of determining a measurement position of a print material according to still another aspect of the present invention, the candidate region extraction step includes setting a region of interest in the print image data, and performing extraction of the measurement candidate region on the basis of a result of the extraction of the image signal value for each region of interest obtained by performing extraction of an image signal value in the region of interest from the print image data at each position while moving a position of the region of interest to scan an entire area of the print image data. Thus, it is possible to automatically extract the measurement candidate region from the print image data.

In the method of determining a measurement position of a print material according to still another aspect of the present invention, each position of the region of interest set in the print image data is set to a position at which the regions of interest do not overlap in the measurement candidate region extraction step. Thus, it is possible to automatically extract the measurement candidate region from the print image data.

In the method of determining a measurement position of a print material according to still another aspect of the present invention, each position of the region of interest set in the print image data is set to a position at which the regions of interest that are adjacent to each other partially overlap in the measurement candidate region extraction step. Thus, it is possible to automatically extract the measurement candidate region from the print image data.

The method of determining a measurement position of a print material according to still another aspect of the present invention further comprises a presentation step of presenting the measurement position of the print material determined in the determination step. Thus, it is possible to present the measurement position of the print material to the user.

In the method of determining a measurement position of a print material according to still another aspect of the present invention, the presentation step includes performing a process of adding information indicating the measurement position to the print image data, and displaying an image based on the print image data subjected to the process on a display unit. Thus, it is possible to easily present the measurement position of the print material to the user.

In the method of determining a measurement position of a print material according to still another aspect of the present invention, the presentation step includes generating a measurement position presentation guide indicating the measurement position of the print material on the basis of the print image data, and arranging the measurement position presentation guide on the print material to present the measurement position. Thus, it is possible to easily present the measurement position of the print material to the user. In this disclosure, "to be arranged on a print material" indicates to be arranged on a surface on which measurement of quality of the print material is performed.

In the method of determining a measurement position of a print material according to still another aspect of the present invention, the measurement of the quality of the print material includes at least one of color measurement of the print material, measurement of a halftone dot area rate of the image printed on the print material, measurement of a degree of glossiness of the print material, or measurement of a bidirectional reflectance distribution function of the print material.

A method of measuring a print material for achieving the second object of the present invention comprises: measuring quality of the print material at a measurement position determined using the method of determining the measurement position of a print material described above.

A device for determining a measurement position of a print material for achieving the second object of the present invention comprises: a candidate region extraction unit that analyzes print image data of an image to be printed on the print material to extract a plurality of measurement candidate regions that are candidates of a measurement position for measuring quality of the print material, image signal values in the plurality of measurement candidate regions being equal individually for the respective regions; an allocation unit that determines, for each measurement candidate region group, the number of measurement positions to be allocated to each of the plurality of measurement candidate region groups of which image signal values are different on the basis of a result of the extraction in the measurement candidate region extraction unit in a case where a group of the measurement candidate regions of which the image signal values are the same is defined as one measurement candidate region group; and a determination unit that determines the position of the measurement candidate region corresponding to the number of allocations to each measurement candidate region group in the allocation unit, as the measurement position, in which the allocation unit excludes the measurement candidate region group of which the image signal value is within a predetermined range with respect to the image signal value of the measurement candidate region group to which the measurement position has been allocated, from targets of allocation of the measurement position.

According to the method of presenting a measurement position, the method of manufacturing a measurement position presentation guide, and the method of measuring a print material for achieving the first object of the present invention, it is possible to easily present the measurement position on the print material. Further, according to the method of determining a measurement position of a print material, a device for determining a measurement position of a print material, and the method of measuring a print material for achieving the second object of the present invention, it is possible to appropriately determine the measurement position on the print material.

BRIEF DESCRIPTION OF THE DRAWINGS

FIG. 26 is a schematic diagram of a color measurement device of another example of the seventh embodiment.

DESCRIPTION OF THE PREFERRED EMBODIMENTS

[Configuration of First Embodiment]

Figure 1:
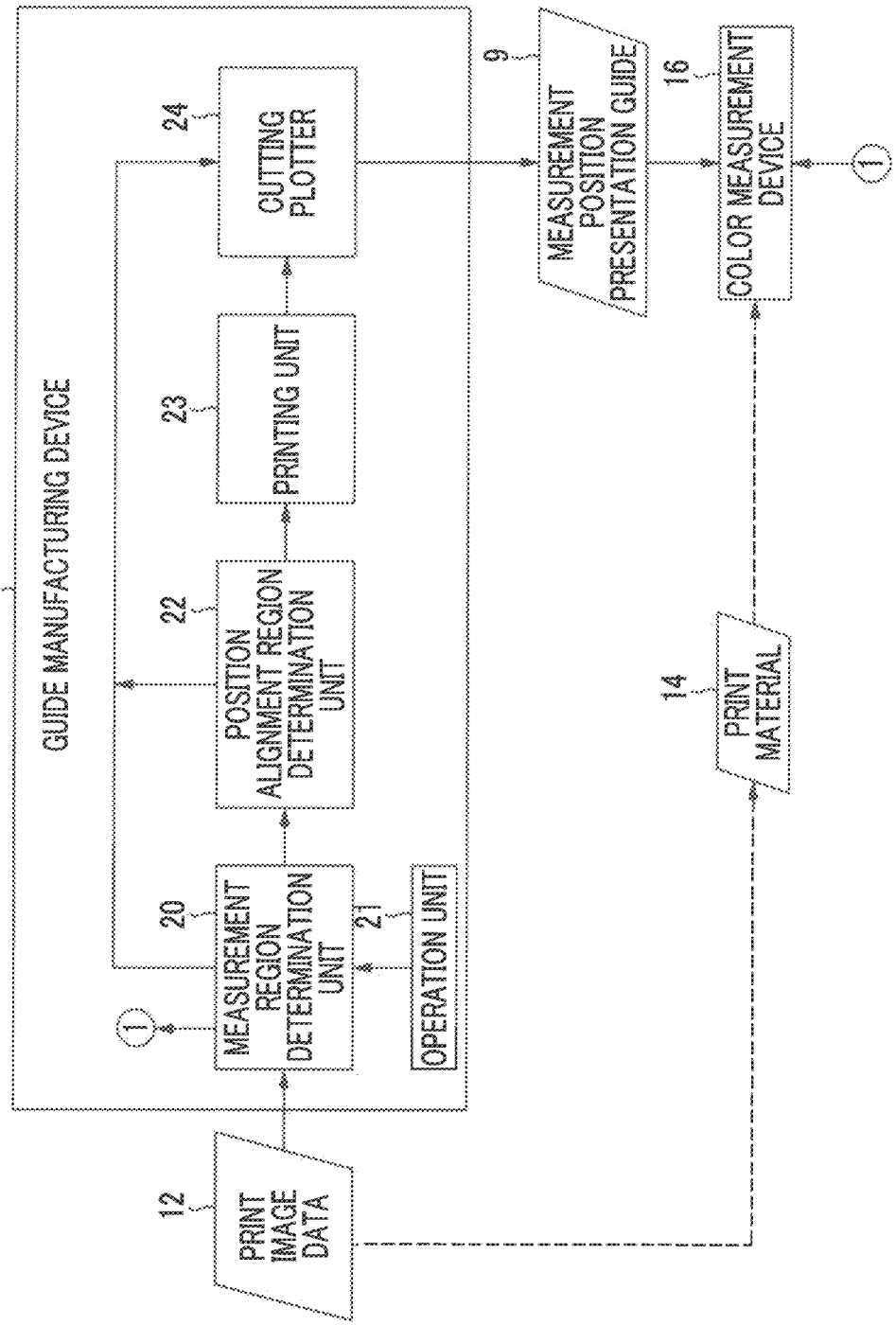
FIG. 1 is a schematic view of a guide manufacturing device that manufactures a measurement position presentation guide for achieving a first object of the present invention.

FIG. 1 is a schematic view of a guide manufacturing device 10 that manufactures a measurement position presentation guide 9 for achieving the first object of the present invention. The measurement position presentation guide 9 is used for presentation of the measurement position to an operator when measurement of quality of a print material 14 printed on the basis of print image data 12 (color measurement in this embodiment) is performed in a color measurement device 16.

As illustrated in FIG. 1, the guide manufacturing device 10 broadly includes a measurement region determination unit 20, an operation unit 21, a position alignment region determination unit 22, a printing unit 23, and a cutting plotter 24, and receives an input of the print image data 12 to manufacture the measurement position presentation guide 9. Here, the print image data 12 includes read image data generated by reading an image printed on a print material 14 using a scanner or the like, in addition to original image data of an image to be printed on the print material 14.

A measurement region determination unit 20 performs an process capable of designating the measurement region 31 (see FIG. 4) indicating a measurement position on the print image data 12 on the basis of a measurement region designation operation to be described below that is performed in the operation unit 21. That is, in the first embodiment, the operator operates the operation unit 21 to manually perform setting of the measurement region 31.

<Designation Operation for Measurement Region>

Figure 2:
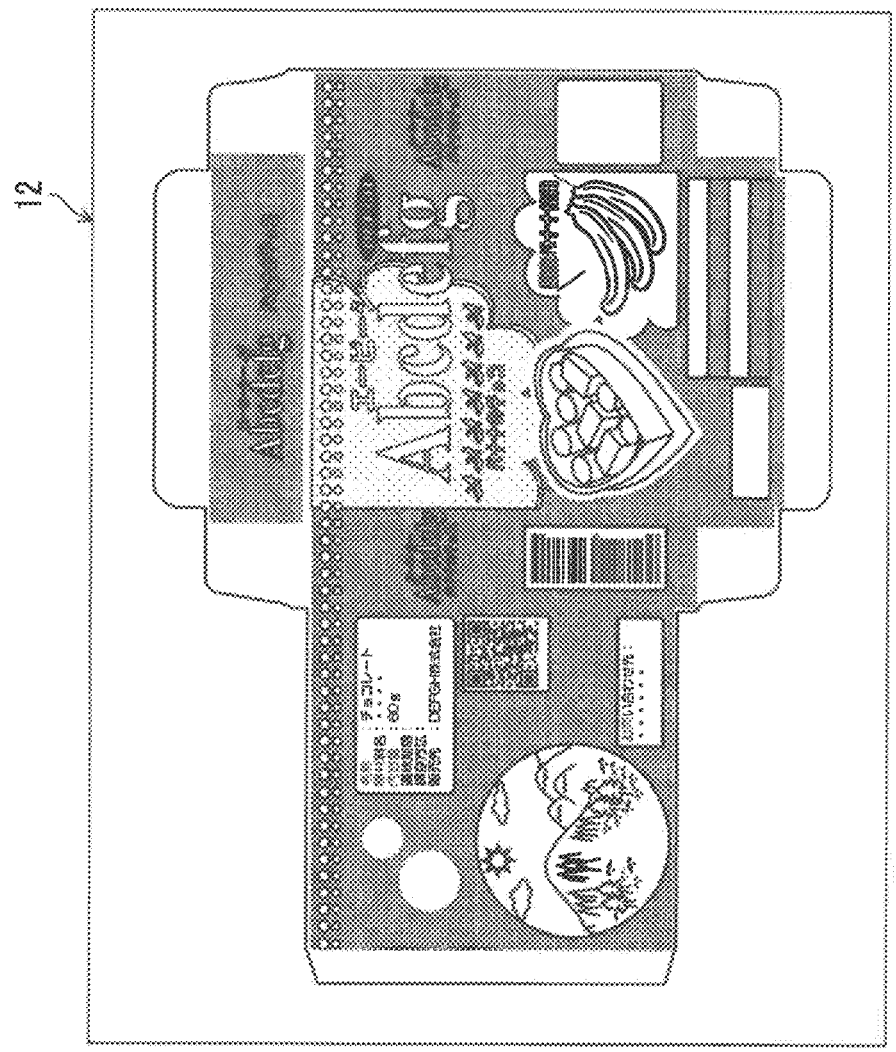
FIG. 2 is a front view of an image based on print image data.
Figure 3:
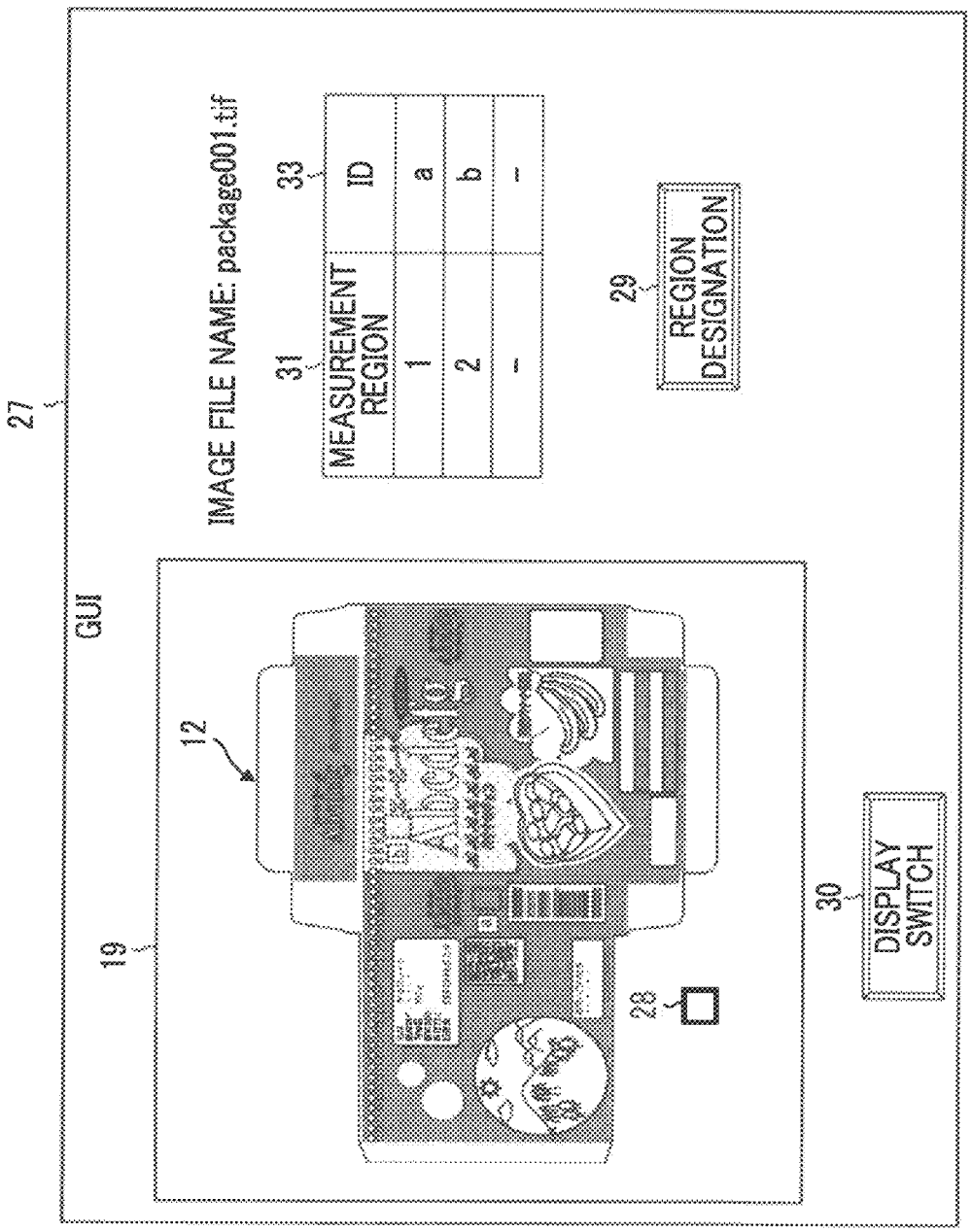
FIG. 3 is an illustrative diagram illustrating an example of a graphical user interface (GUI) that performs a measurement region designation operation.
Figure 4:
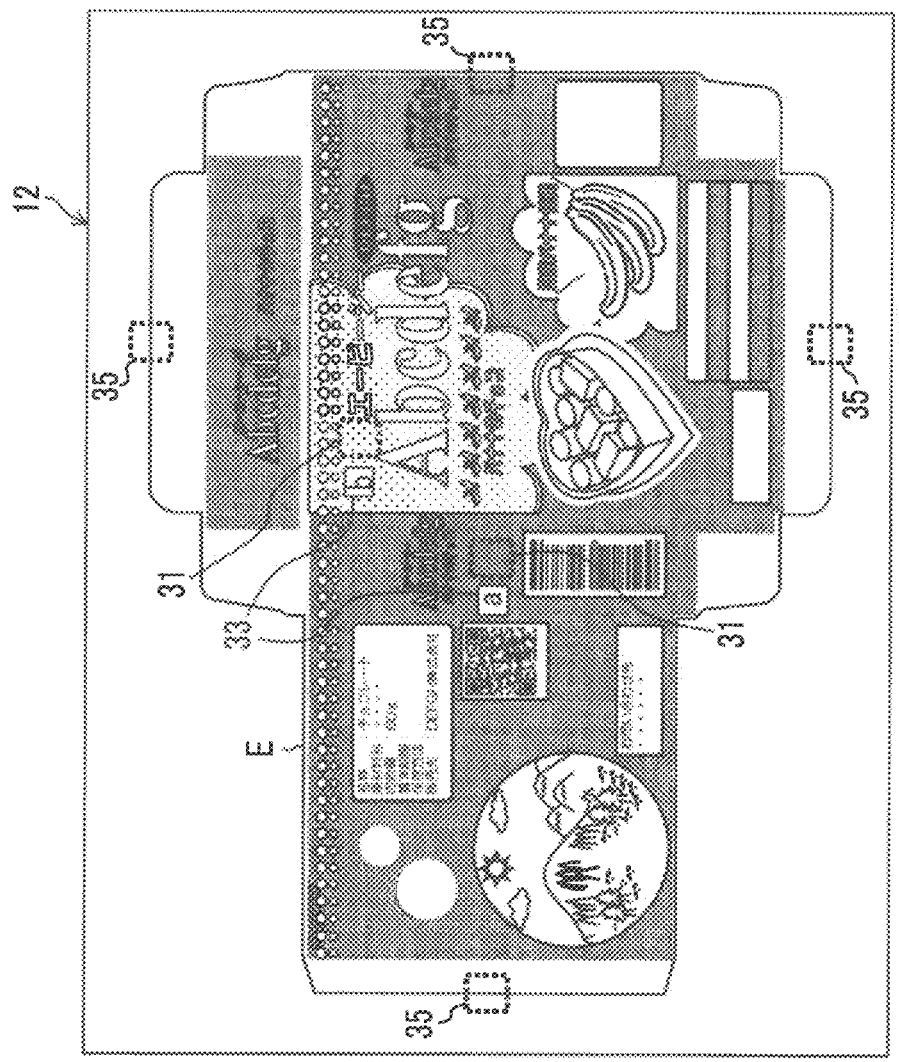
FIG. 4 is a front view of an image on the basis of print image data after a measurement region designation operation.

FIG. 2 is a front view of an image based on the print image data 12. FIG. 3 is an illustrative diagram illustrating an example of a graphical user interface (GUI) that performs a measurement region designation operation. FIG. 4 is a front view of the image based on the print image data 12 after a measurement region designation operation. Color or light and shape of an image cannot be expressed due to restrictions of illustration of the figure in each figure, but is actually image content with light and shade due to various colors (the same applies to other similar drawings).

If the print image data 12 as illustrated in FIG. 2 is input to the guide manufacturing device 10, the measurement region determination unit 20 displays a GUI for performing a measurement region designation operation on a display unit 27 (not illustrated in FIG. 1) on the basis of the print image data 12, as illustrated in FIG. 3. An image display field 19 in which the image based on the print image data 12 is displayed, a cursor 28, a region designation button 29, a display switching button 30, and a file name of the print image data 12 are included in the this GUI. The GUI for a measurement region specifying operation is not limited to the example illustrated in FIG. 3, and may be changed.

A measurement region designation operation is performed in which the operator operates the operation unit 21 on the GUI to move the cursor 28 to the desired measurement region 31, and then, clicks the region designation button 29 (including an operation corresponding to a button such as touch). In this embodiment, in the following description, two measurement regions 31 are assumed to be designated.

As illustrated in FIG. 4, when the measurement region designation operation is performed, the measurement region determination unit 20 performs a process of adding information (for example, a cutout line indicated by a dotted frame in this embodiment) capable of specifying the measurement region 31 at a position designated by the cursor 28 to the print image data 12. Here, examples of the measurement region 31 designated by the operator may include a region of color with a high area proportion indicating a percentage of the measurement region 31 in the print image data 12 (here, the color includes concentration of the color), a region having a low area proportion, but including important color (for example, a region including a logo of a corporate or corporate color), and a region including an important region such as character.

In this case, the measurement region determination unit 20 may analyze the print image data 12 and perform a warning display to the operator to prompt the user to specify another area in a case where an image signal value of the measurement region 31 designated by the operator is not uniform. In this case, a predetermined variation in the image signal value may be allowed in the region so that a region in which there is a slight change, but color measurement can be performed, such as a gradual gradation region in an image, can also be selected as the measurement region 31 (for example, an image signal value that is a 8-bit value and is within ±2 is allowed).

Figure 5:
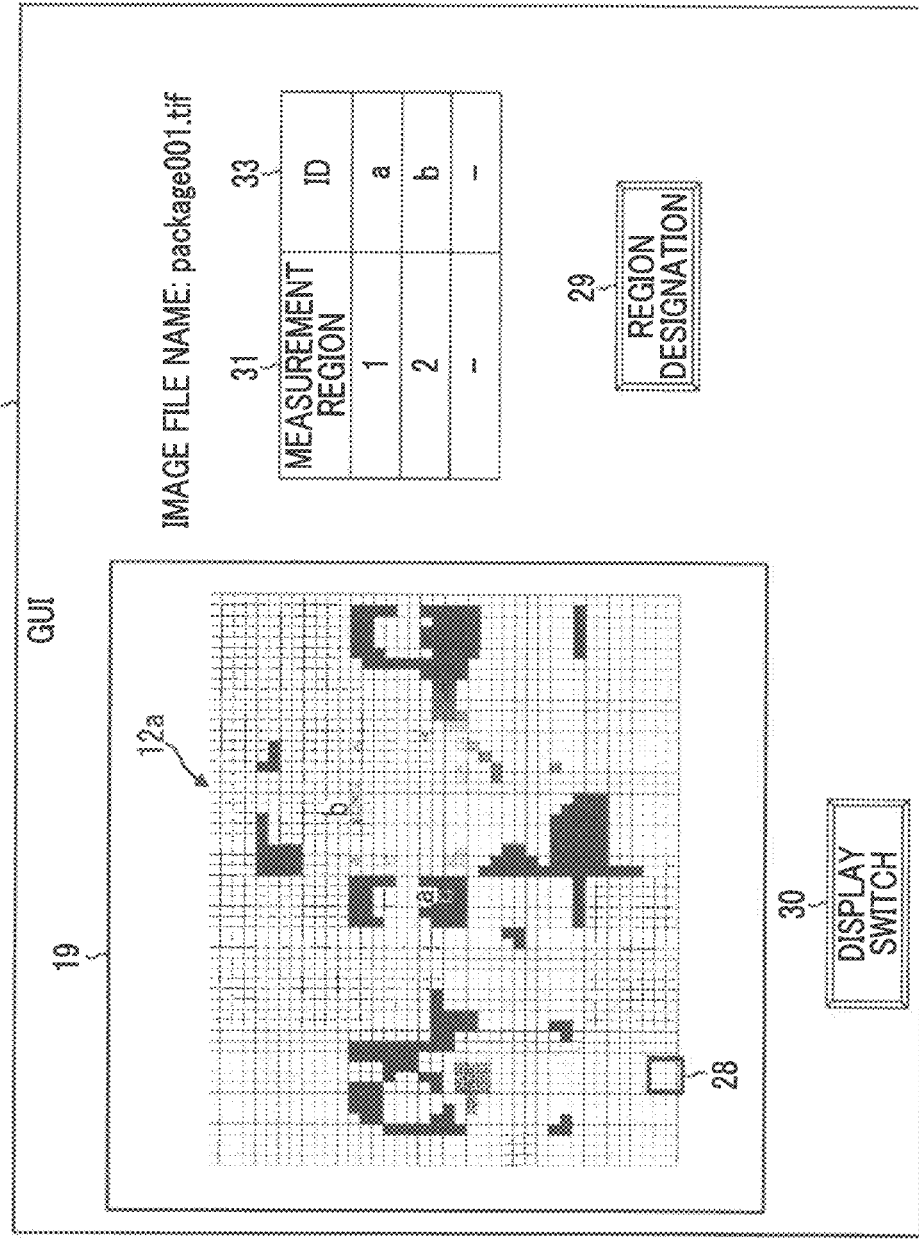
FIG. 5 is an illustrative diagram illustrating another example of the GUI illustrated in FIG. 3.

Further, in this case, an allowable value of a variation may be changed according to an area proportion of the screen tint region in the image (see FIG. 5). For example, in a case where the screen tint region is present on the entire surface (100%) of the image, the allowable value may be set to 0, in a case where the screen tint region is present at 50%, the allowable value may be set to ±2, and in a case where the screen tint region is present at 0% (no uniform screen tint region), the allowable value may be set to ±4. Thus, even when there is a small screen tint region in the image, it is possible to extend candidates of measurement positions. Here, the screen tint region is a region formed of a square region having a side equal to or larger than an aperture diameter of the color measurement device 41 to be described below (see FIG. 7) and is a region in which image signal values are uniform within the region.

Referring back to FIG. 3, the display switching button 30 is a button for performing an instruction to switch a display aspect of the image displayed in the image display field 19.

FIG. 5 is an illustrative diagram illustrating another example of the GUI illustrated in FIG. 3. As illustrated in FIG. 5, if the display switching button 30 is clicked, the measurement region determination unit 20 analyzes the print image data 12 to detect the above-described screen tint region, and displays a screen tint region image 12a based on a result of the detection in the image display field 19. Here, the screen tint region is not limited to a region in which the image signal value is uniform, and may include a region in a range of the above-described allowable value.

<Addition of Measurement Region Information>

Referring back to FIGS. 3 and 4, the measurement region determination unit 20 performs a process of adding the measurement region information 33 (corresponding to position information of the present invention) indicating the measurement region 31 designated by the operator to the print image data 12 each time a measurement region designation operation is performed. The measurement region information 33 is information including information such as ID (identification) numbers of the measurement regions 31, or positions or shapes (including sizes) of the measurement regions 31, although not illustrated. As this embodiment, "a" and "b" as ID numbers are added to the measurement regions 31. Thus, a correspondence relationship between the measurement region 31 designated by the operator on the GUI and the measurement region 31 formed in the measurement position presentation guide 9 to be described below becomes clear. Therefore, the measurement region information 33 serves as position information indicating a position of the measurement region 31 in the measurement position presentation guide 9.

The measurement region determination unit 20 outputs the print image data 12 to which the cutout line indicating the measurement region 31 and the measurement region information 33 have been added, to the position alignment region determination unit 22 (see FIG. 1). Further, the measurement region determination unit 20 outputs the measurement region information 33 to the cutting plotter 24 and a color measurement device 16 to be described below.

<Addition of Position Alignment Region>

The position alignment region determination unit 22 performs a process of analyzing the print image data 12 input from the measurement region determination unit 20 to detect an position alignment region 35 that is used for alignment of the print material 14 and the measurement position presentation guide 9, and adding information capable of specifying the position alignment region 35 (for example, cutout line shown by a dotted frame in this embodiment) to the print image data 12. Here, the position alignment of the print material 14 and the measurement position presentation guide 9 is alignment of an image of the print image data 12 printed on the print material 14 and the image of the print image data 12 printed on the measurement position presentation guide 9.

Specifically, the position alignment region determination unit 22 analyzes the print image data 12 using a known edge detection method and determines a portion of an edge E that is an outline of the image based on the print image data 12 as the position alignment region 35. In this case, the position alignment region determination unit 22 determines each of a plurality of (at least two) regions with a different direction of the edge E (direction along the edge E) as the position alignment region 35. Thus, it is possible to improve position alignment accuracy when position alignment of the print material 14 and the measurement position presentation guide 9 is performed. Here, in a case where, for example, a region in which the edges E intersect or a region in which the edge E is bent, as well as the region in which the edge E is only one straight line, is selected as the position alignment region 35, it is preferable for position alignment accuracy to be further improved.

In a case where the image based on the print image data 12 is circular, the position alignment cannot be performed with only the edge E which is a contour of the image. Accordingly, in this case, an image of a portion of an internal edge of the image is determined as the position alignment region 35.

The position alignment region determination unit 22 outputs the print image data 12 subjected to the process of adding the cutout line indicating the position alignment region 35 to the printing unit 23 (see FIG. 1). Further, the position alignment region determination unit 22 outputs position alignment region information on a position and a shape of the position alignment region 35 to the cutting plotter 24. In this embodiment, although the process in the position alignment region determination unit 22 is performed after the processing in the measurement region determination unit 20, an order may be reversed or may be simultaneous.

For the printing unit 23, for example, various known image recording devices such as an ink jet printer have been used, and the printing unit 23 prints the image based on the print image data 12 on a recording medium 37 (see FIG. 6) on the basis of the print image data 12 input from the position alignment region determination unit 22. A type of the recording medium 37 is not particularly limited. The recording medium 37 on which the image based on the print image data 12 has been printed is set in the cutting plotter 24.

Figure 6:
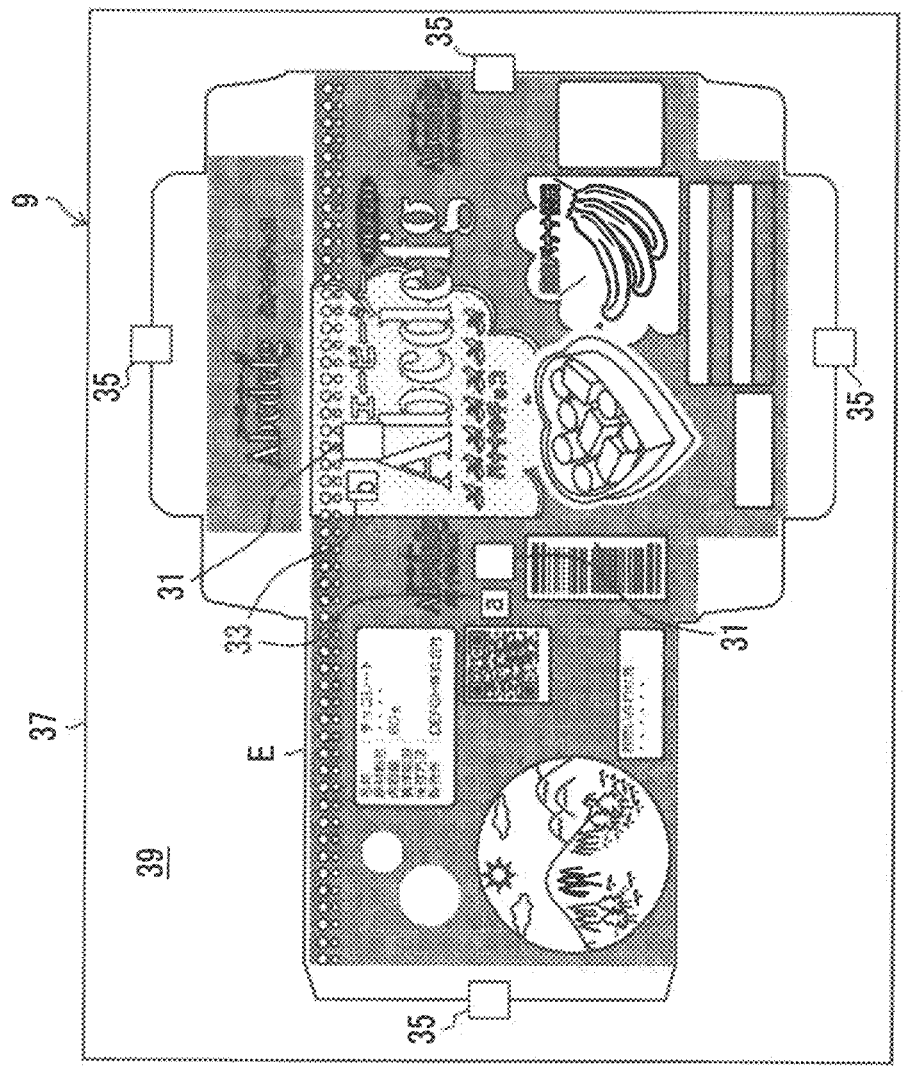
FIG. 6 is a front view of a measurement position presentation guide.

FIG. 6 is a front view of the measurement position presentation guide 9. As illustrated in FIG. 6, the cutting plotter 24 performs a process of cutting out a portion (cutout line) corresponding to the measurement region 31 and the position alignment region 35 from the recording medium 37 on the basis of the measurement region information 33 input from the measurement region determination unit 20 and the position alignment region information input from the position alignment region determination unit 22. Thus, the measurement position presentation guide 9 is generated. Although the cutout process is automatically performed using the cutting plotter 24 in this embodiment, the portion (cutout line) corresponding to the measurement region 31 and the position alignment region 35 illustrated in FIG. 4 may be cut out manually, for example, using a cutter or the like.

The measurement position presentation guide 9 includes a printing surface 39 on which the image based on the print image data 12 is printed, the measurement regions 31 and the position alignment regions 35 respectively indicated by a plurality of apertures formed on the printing surface 39 by the above-described cutout process, and the measurement region information 33 indicating a position of the measurement region 31 on the printing surface 39. Thus, the measurement position presentation guide 9 cuts out portions corresponding to the measurement region 31 and the position alignment region 35 from the recording medium 37 on which the same image as the image printed on the print material 14 on the basis of the print image data 12 has been printed. This measurement position presentation guide 9 is used for color measurement of the print material 14 in the color measurement device 16 (see FIG. 1).

Figure 7:
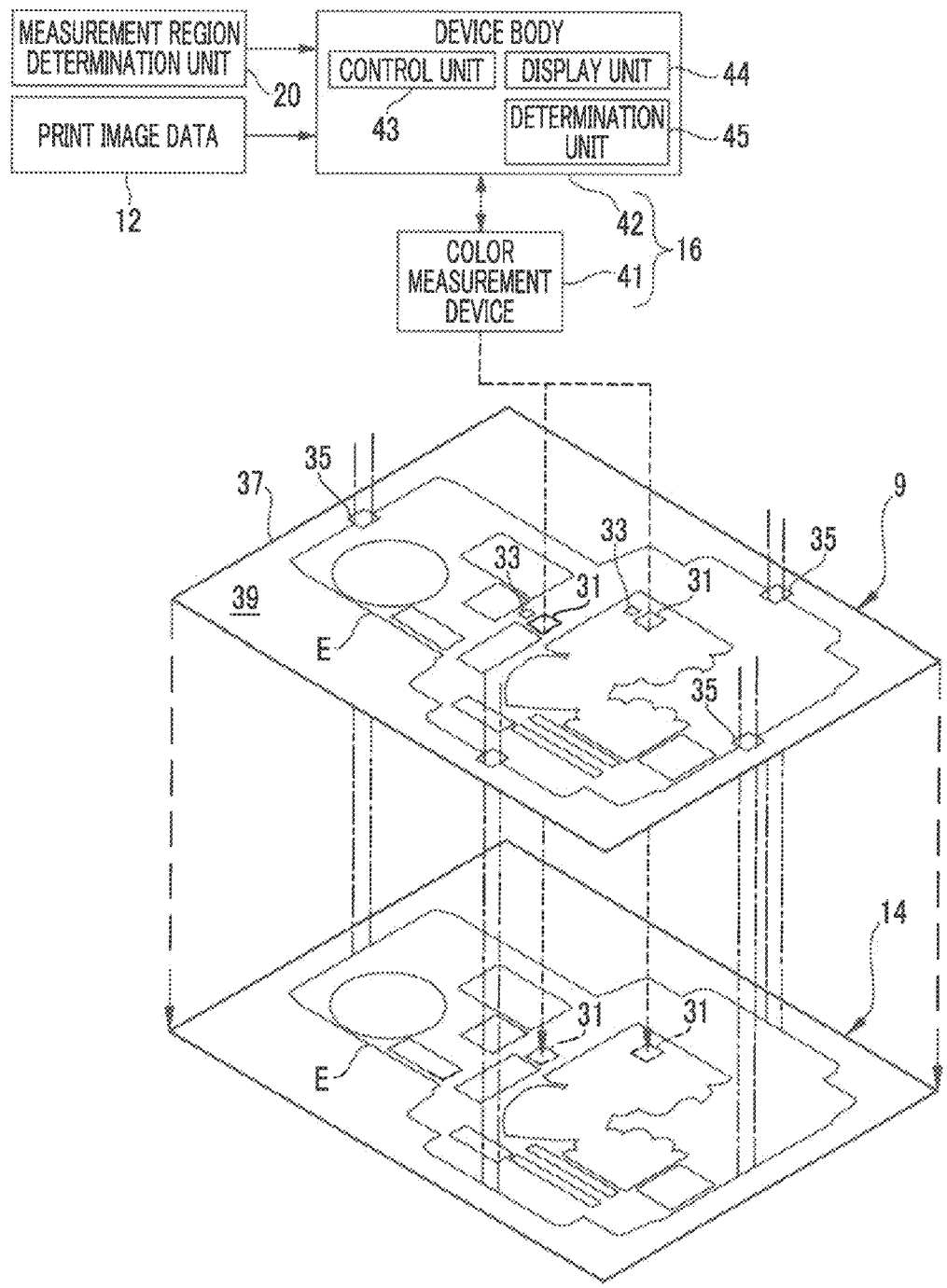
FIG. 7 is a schematic diagram of a color measurement device.

FIG. 7 is a schematic diagram of the color measurement device 16. As illustrated in FIG. 7, the color measurement device 16 includes a stage (not illustrated) in which the print material 14 and the measurement position presentation guide 9 are set, a color measurement device 41, and a device body 42.

The print material 14 on which the image based on the print image data 12 has been printed is set in the stage of the color measurement device 16. The measurement position presentation guide 9 is arranged on this print material 14. In this case, the image printed on the print material 14 is exposed in the aperture corresponding to the position alignment region 35 of the printing surface 39 of the measurement position presentation guide 9. Therefore, position alignment between the edge E of the image of the print image data 12 printed on the printing surface 39 of the measurement position presentation guide 9 and the edge E of the image of the print image data 12 printed on the print material 14 can be performed. Therefore, the position of the measurement position presentation guide 9 on the print material 14 is adjusted so that the edge E of the image printed on the printing surface 39 matches the edge E of the image printed on the print material 14. To arrange the measurement position presentation guide 9 on the print material 14 is to overlap and arrange the measurement position presentation guide 9 on a surface in which color measurement of the print material 14 is performed.

When position alignment between the measurement position presentation guide 9 and the print material 14 is made, the measurement regions 31 (displayed by a dotted frame) in the image printed on the print material 14 are exposed through the apertures corresponding to the respective measurement regions 31 of the measurement position presentation guide 9. Since the measurement position presentation guide 9 and the print material 14 are aligned, the positions of the respective measurement regions 31 of both match. Thus, the measurement regions 31 that are measurement positions of the print material 14 are presented to the operator through the measurement position presentation guide 9.

For the color measurement device 41, for example, a variety of color measurement devices such as a handy type of known color measurement device are used. In this embodiment, i1Pro or i1Pro2 available from X-Rite, Inc. is used. The color measurement device 41 comes in contact with each measurement region 31 of the print material 14 through the aperture corresponding to each measurement region 31 of the measurement position presentation guide 9 by a manual operation of the operator. The color measurement device 41 receives a measurement start instruction from the device body 42, performs color measurement for the measurement region 31 of the print material 14, and outputs a color measurement value of the measurement region 31 to the device body 42.

For the device body 42, for example, a computing device such as a personal computer is used. A control unit 43, a display unit 44, and a determination unit 45 are provided in the device body 42. The control unit 43 is, for example, a central processing unit, and controls color measurement in the color measurement device 41 by executing a predetermined program stored in a memory (not illustrated).

The control unit 43 acquires the measurement region information 33 (information on an ID, and a position and a shape of the measurement region 31) from the above-described measurement region determination unit 20. Further, the device body 42 acquires the print image data 12. Then, the control unit 43 displays the GUI for a color measurement operation when the color measurement is performed by the color measurement device 41 on the display unit 44 on the basis of the measurement region information 33 acquired from the measurement region determination unit 20 and the print image data 12. The operator may directly input the measurement region information 33 to the control unit 43 using a keyboard or the like.

Figure 8:
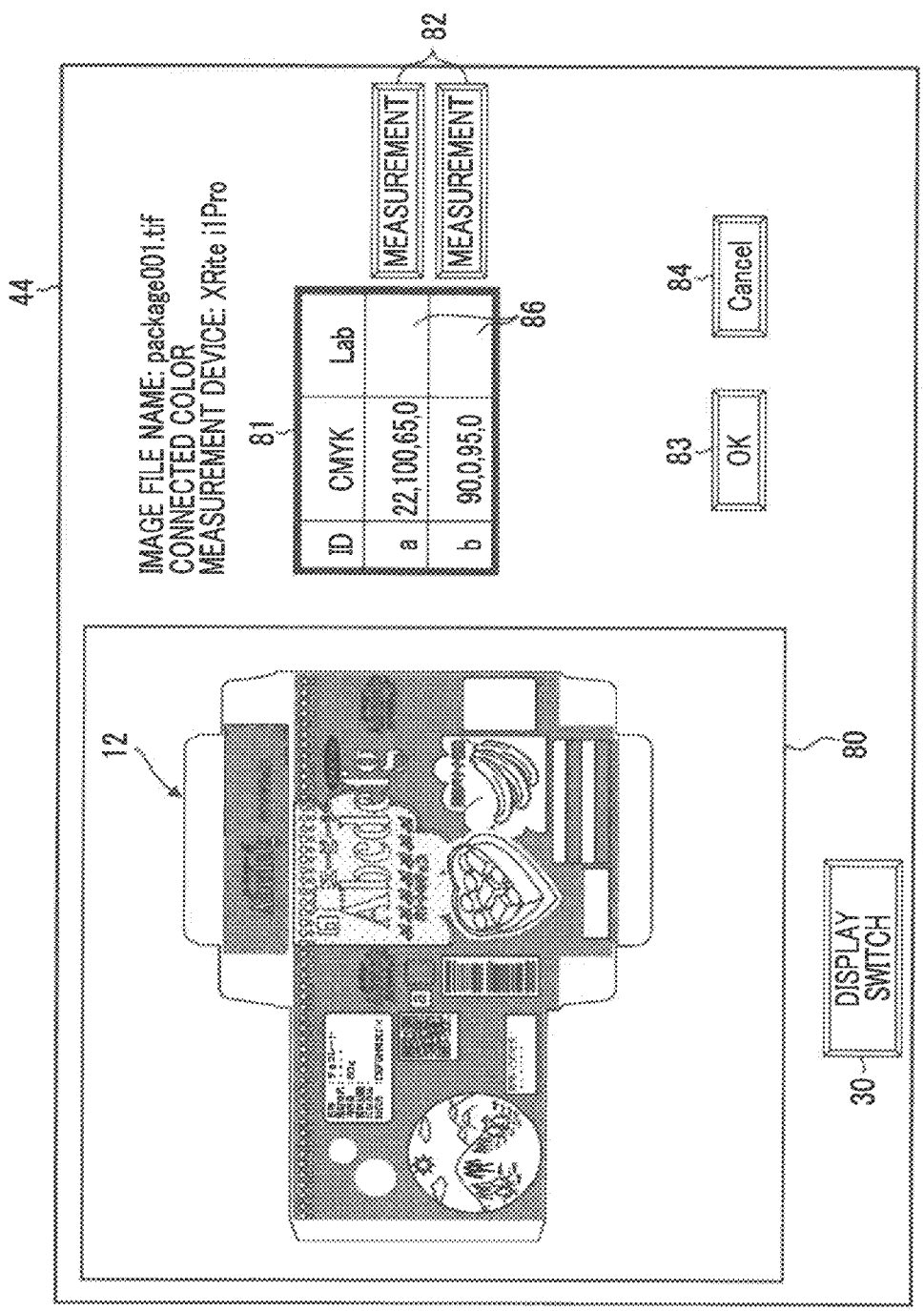
FIG. 8 is an illustrative diagram illustrating an example of a GUI for a color measurement operation.

FIG. 8 is an illustrative diagram illustrating an example of the GUI for a color measurement operation that is displayed on the display unit 44.

As illustrated in FIG. 8, an image display field 80 for the image corresponding to the print material 14, a measurement region display field 81, a measurement button 82, an OK button 83, a cancel button 84, the above-described display switching button 30, a file name of the print image data 12, and a model name of the color measurement device 41 are included in the GUI displayed on the display unit 44. The GUI displayed on the display unit 44 is not limited to the example illustrated in FIG. 8, and may be appropriately changed.

The image corresponding to the print material 14 is displayed in the image display field 80 on the basis of the print image data 12. The measurement region information 33 that the control unit 43 has acquired from the measurement region determination unit 20 is included in the image.

An ID field in which the measurement region information 33 (ID) of each measurement region 31 is displayed, a CMYK field in which CMYK values (C: Cyan, M: Magenta, Y: yellow, and K: black) of the print image data 12 corresponding to each measurement region 31 is displayed, and a Lab field in which a color measurement value (Lab value in this embodiment) of each measurement region 31 is displayed are included in the measurement region display field 81. The control unit 43 performs a display of the ID field and the CMYK field on the basis of the measurement region information 33 acquired from the measurement region determination unit 20 and the print image data 12.

Further, the control unit 43 performs a display of the Lab field on the basis of the color measurement value input from the color measurement device 41.

The measurement button 82 is a GUI button for instructing execution of color measurement in the color measurement device 41. In this embodiment, the measurement button 82 is provided for each measurement region 31 listed in the measurement region display field 81. The user clicks the measurement button 82 corresponding to the measurement region 31 in a state in which the operator causes the color measurement device 41 to come in close contact with the measurement region 31 of the print material 14, such that the color measurement for the measurement regions 31 by the color measurement device 41 is executed. When the color measurement value is input from the color measurement device 41 to the control unit 43, the color measurement value is displayed in a cell 86 of the above-described Lab field corresponding to the measurement region 31 for which the color measurement has been performed.

The OK button 83 is a button for performing a command to complete the color measurement in the color measurement device 41. The cancel button 84 is a button for performing an instruction to cancel a process or an operation. By clicking the OK button 83, the color measurement in the color measurement device 41 is completed and a result of the measurement is stored.

Referring back to FIG. 7, the determination unit 45 performs a determination whether or not the color measurement (measurement) has been correctly performed by the color measurement device 41, that is, error check for the color measurement value on the basis of the image signal value obtained from the print image data 12 and the color measurement value of the measurement region 31 color-measured by the color measurement device 41. Here, an example in which the color measurement is not correctly performed may include a case in which the color measurement is performed in a position (including another measurement region 31) different from the designated measurement region 31, and a case in which the color measurement is performed without causing the color measurement device 41 to sufficiently come in close contact with the measurement region 31 of the print material 14.

The determination unit 45 determines the measurement region 31 of the print image data 12 on the basis of the measurement region information 33 or the like. In a case where the print image data 12 is CMYK image data, the determination unit 45 converts an image signal value of CMYK of each measurement region 31 of the print image data 12 into an assumed color measurement value (Lab value) using, for example, a JapanColor (registered trademark) profile (or another profile). This assumed color measurement value is a typical color measurement value that is assumed to be obtained as a color measurement value when color measurement of the printed image on the basis of the print image data 12 is performed. In a case where the print image data 12 is RGB (R: Red, G: Green, B: Blue) image data, the determination unit 45 converts the image signal value into an assumed color measurement value, for example, using an sRGB profile or an AdobeRGB profile (which may be another profile).

Then, for each measurement region 31 in which the color measurement is performed by the color measurement device 41, the determination unit 45 compares the color measurement value obtained from the color measurement device 41 with the above-described assumed color measurement value to determine whether the color measurement in the color measurement device 41 has been correctly performed in the designated measurement region 31 (OK/NG).

Here, there is substantially no case where the color measurement value obtained from the color measurement device 41 and the assumed color measurement value completely match, but in a case where both are significantly different, the color measurement in the color measurement device 41 is highly likely not to be correctly performed in the designated measurement region 31. For example, the color of the measurement region 31 assumed from the assumed color measurement value is "red", whereas the color of the measurement region assumed from the color measurement value of the color measurement device 41 may be "blue". Therefore, the determination unit 45 performs a determination of "OK" or "NG", for example, on the basis of whether a color difference between the color measurement value of the color measurement device 41 and the assumed color measurement value is within a predetermined range (for example, within a color difference 10).

In this case, the color difference of the above-described determination criterion may be changed using a saturation of the assumed color measurement value or the color measurement value obtained by the color measurement device 41. For example, the color difference of the criterion may be in proportional to the saturation (as color has lower saturation, a determination color difference is small and a strict determination criterion is obtained).

The determination unit 45 performs a warning display indicating that "NG" is determined in a case where "NG" is determined (a display on the display unit 44 or an audio display using a speaker or the like). Thus, it is possible to prompt re-color measurement operator.

[Operation of First Embodiment]

Next, a flow of a process of manufacturing the measurement position presentation guide 9 in the guide manufacturing device 10 having the above configuration and a color measurement process in the color measurement device 16 (a process of manufacturing a measurement position presentation guide for achieving the first object of the present invention, a method of presenting a measurement position, and a method of measuring a print material) will be described.

<Process of Manufacturing Measurement Position Presentation Guide>

Figure 9:
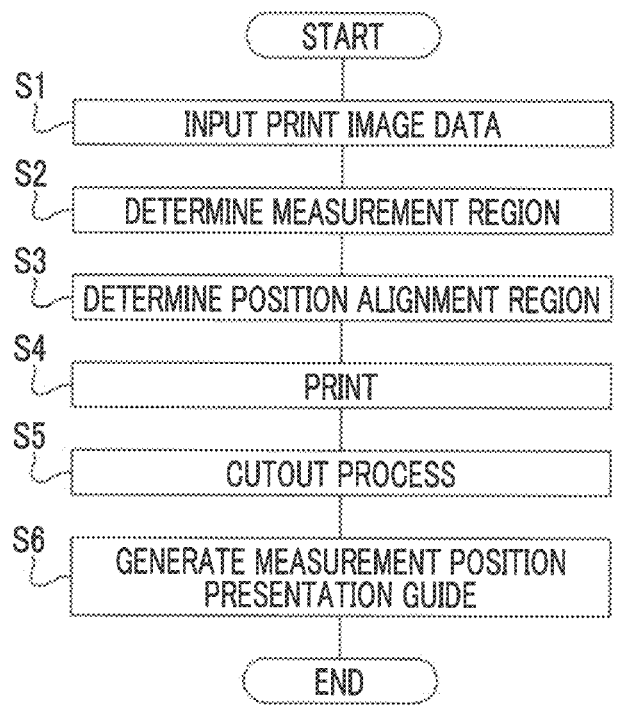
FIG. 9 is a flowchart illustrating a flow of a process of manufacturing a measurement position presentation guide.

FIG. 9 is a flowchart illustrating a flow of a process of manufacturing the measurement position presentation guide 9 in the guide manufacturing device 10. As illustrated in FIG. 9, first, the print image data 12 of the image printed on the print material 14 is input to the guide manufacturing device 10 (step S1).

When the print image data 12 is input to the guide manufacturing device 10, the measurement region determination unit 20 displays the GUI illustrated in FIG. 3 described above on the display unit 27 on the basis of the print image data 12. When the GUI is displayed on the display unit 27, the operator operates the operation unit 21 to move the cursor 28 to a desired measurement region 31, and then, clicks on the region designation button 29 to execute the measurement region designation operation.

When the measurement region designation operation is performed, the measurement region determination unit 20 performs a process of adding the cutout line indicating the measurement region 31 at the position designated by the cursor 28 to the print image data 12. Thus, the measurement region 31 in which the color measurement is performed in the print material 14 is determined (step S2; corresponding to a determination step of the present invention). Further, at the same time as this, the measurement region determination unit 20 performs a process of adding the measurement region information 33 (for example, ID) indicating the measurement region 31 designated by the operator to the print image data 12.

Hereinafter, similarly, the measurement region determination unit 20 repeatedly executes the process of adding the cutout line indicating the measurement region 31 to the print image data 12 and the process of adding the measurement region information 33 (for example, ID) each time the operator performs a measurement region designation operation. Thus, the determination of a new measurement region 31 is sequentially performed. If the determination of all the measurement regions 31 ends, the measurement region determination unit 20 outputs the processed print image data 12 to the position alignment region determination unit 22. Further, the measurement region determination unit 20 outputs the measurement region information 33 to the cutting plotter 24 and the color measurement device 16.

The position alignment region determination unit 22 analyzes the print image data 12 input from the measurement region determination unit 20 and determines the plurality of regions in which directions of the edges E are different from each other among the edges E of the image based on the print image data 12 as the position alignment regions 35 (step S3). The position alignment region determination unit 22 performs the process of adding the cutout line indicating each position alignment region 35 to the print image data 12 to output the print image data 12 after processing to the printing unit 23. Further, the position alignment region determination unit 22 outputs position alignment region information on the position and the shape of the position alignment region 35 to the cutting plotter 24.

The printing unit 23 prints the image on the recording medium 37 on the basis of the print image data 12 input from the position alignment region determination unit 22 (step S4). The recording medium 37 after image printing is set in the cutting plotter 24.

The cutting plotter 24 performs a process of cutting out the portion (cutout line) corresponding to the measurement region 31 and the position alignment region 35 with respect to the recording medium 37 on the basis of the measurement region information 33 input from the measurement region determination unit 20 and the position alignment region information input from the position alignment region determination unit 22 (step S5).

Through the process of step S1 to step S5, the measurement position presentation guide 9 based on the print image data 12 is generated (step S6; corresponding to a generation step of the present invention). Accordingly, a process of manufacturing the measurement position presentation guide 9 in the guide manufacturing device 10 is completed.

<Color Measurement Process for Print Material>

Figure 10:
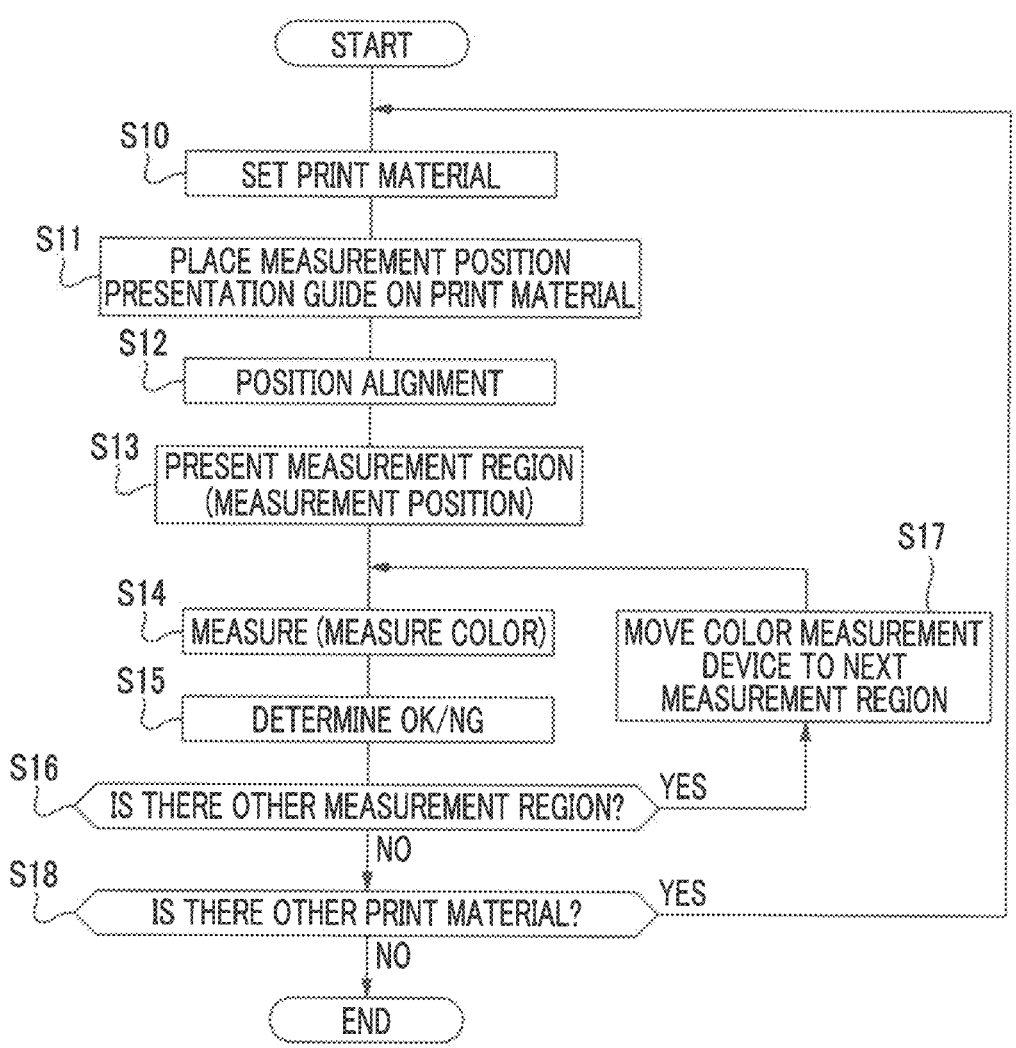
FIG. 10 is a flowchart illustrating a flow of a color measurement process in a color measurement device.

FIG. 10 is a flowchart illustrating a flow of the color measurement process in the color measurement device 16. As illustrated in FIG. 10, first, an operator sets the print material 14 on which the image based on the print image data 12 has been printed on the stage of the color measurement device 16 (step S10). If the operator starts up the color measurement device 16 and performs a selection operation for the print image data 12 corresponding to the print material 14 set on the stage, the control unit 43 of the color measurement device 16 displays the GUI illustrated in FIG. 8 described above on the display unit 44.

Then, the operator arranges the measurement position presentation guide 9 on the print material 14 (step S11; corresponds to an arrangement step of the present invention). The operator adjusts the position of the measurement position presentation guide 9 on the print material 14 so that the edge E of the image printed on the printing surface 39 matches the edge E of the image printed on the print material 14 while viewing the print material 14 exposed in the apertures of the position alignment regions 35 formed in the printing surface 39 of the measurement position presentation guide 9. Accordingly, the image printed on the printing surface 39 of the measurement position presentation guide 9 and the image printed on the print material 14 are aligned (step S12).

Thus, if the position alignment of the measurement position presentation guide 9 and the print material 14 is made, the positions of the respective measurement regions 31 in both match. Accordingly, the respective measurement regions 31 of the print material 14 are presented to the operator through the apertures corresponding to the respective measurement regions 31 of the measurement position presentation guide 9 (step S13; corresponding to a presentation step of the present invention).

The operator causes the color measurement device 41 to come in close contact with the measurement region 31 of the print material 14 exposed in the apertures corresponding to the measurement regions 31 (ID="a") of the measurement position presentation guide 9. Then, if the operator clicks the measurement button 82 on the GUI, color measurement for the measurement regions 31 is executed by the color measurement device 41, and a color measurement value (Lab value) is input from the color measurement device 41 to the control unit 43 (step S14; corresponding to a measurement step of the present invention).

In this case, the determination unit 45 converts the image signal value corresponding to the measurement region 31 (ID="a") of the print image data 12 into an assumed color measurement value (Lab value) using a JapanColor (registered trademark) profile. The determination unit 45 compares the color measurement value obtained from the color measurement device 41 with the assumed color measurement value and determines whether or not the color measurement (measurement) in the color measurement device 41 has been correctly performed (OK/NG) on the basis of a color difference of both (step S15). In a case where the color difference between both is not within a predetermined range, the determination unit 45 performs an NG determination and performs a warning display to indicate the fact. Thus, in a case where the color measurement is not correctly performed, such as a case where the color measurement in the color measurement device 41 is not performed in the designated measurement region 31 or a case where the color measurement device 41 does not come in close contact with the measurement region 31, a warning display is performed to the operator. Thus, the operator can repeat the color measurement using the color measurement device 41.

In a case where the OK determination is made by the determination unit 45, the operator causes the color measurement device 41 to come in contact with the measurement region 31 of the print material 14 exposed to the aperture corresponding to the measurement region 31 (ID="b") of the measurement position presentation guide 9 (YES in step S16, and step S17). Hereinafter, similarly, each of the processes of step S14 to step S17 described above is repeatedly executed for each measurement region 31 of the print material 14. If the color measurement of all of the measurement regions 31 of the print material 14 is completed (NO in step S16), the color measurement of the print material 14 is completed.

In a case where color measurement of another print material 14 is performed, each of the processes from step S14 to step S17 described above is repeatedly performed (step S18). The color measurement process for the print material 14 in the color measurement device 16 is completed.

[Effects of this Embodiment]

As described above, in this embodiment, it is possible to easily present the measurement region 31 on the print material 14 by manufacturing the measurement position presentation guide 9 indicating the measurement region 31 (measurement position) of the print material 14 when arranged on the print material 14 on the basis of the print image data 12 and arranging the measurement position presentation guide 9 on the print material 14. As a result, it is possible to perform color measurement (measurement) with good reproducibility of a predetermined position (measurement region 31) of the print material 14. Accordingly, even in a case where the color measurement of the gradation region within the image printed on the print material 14 is performed, a deviation of the color measurement value caused by a position deviation of the measurement position is prevented to occur since the measurement position is fixed by the measurement position presentation guide 9.

Further, when color measurement of the two print materials 14 is performed using the measurement position presentation guide 9 for the purpose of evaluation of color deviation between the two print materials 14, the measurement position is fixed by the measurement position presentation guide 9 to prevent deviation of the color measurement value caused by the displacement of the measurement position. As a result, it is possible to evaluate color deviation between the two print materials 14 caused by unevenness of printing. That is, it is possible to apply this embodiment to the evaluation of the color deviation between the plurality of print materials 14.

[Second Embodiment]

Figure 11:
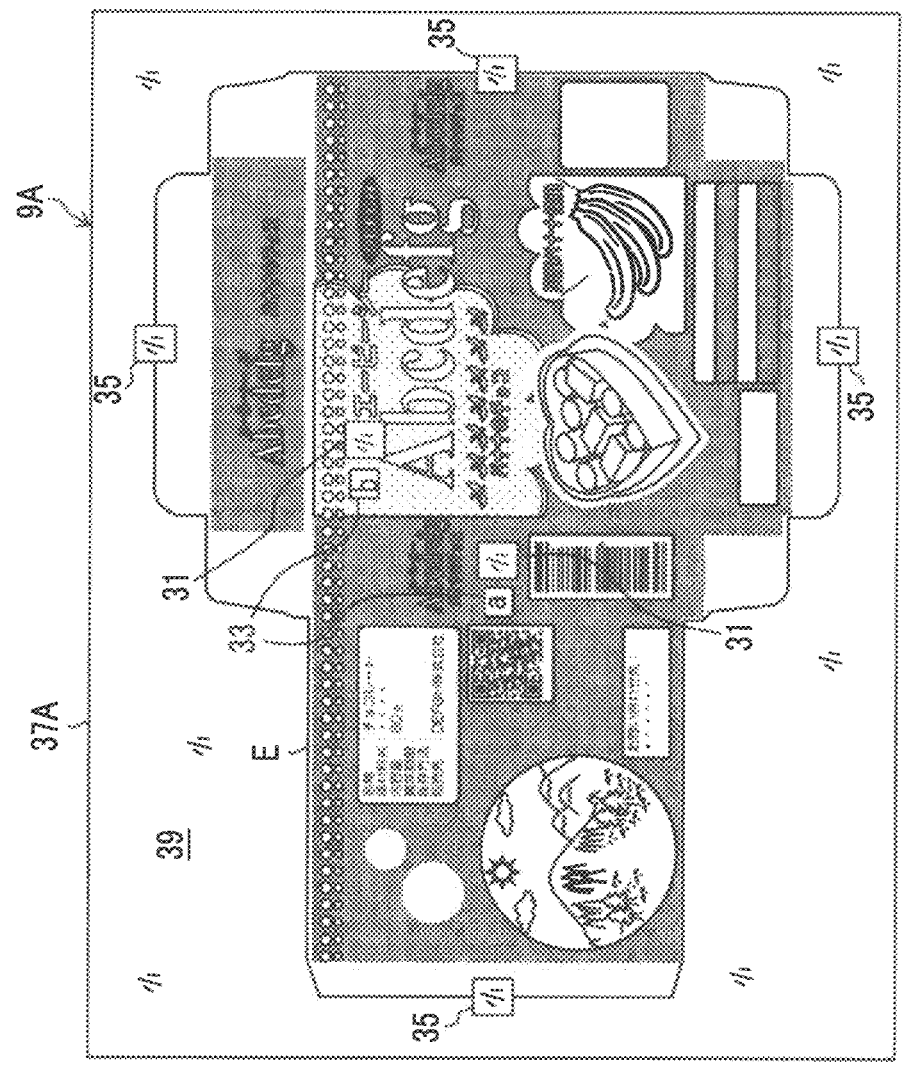
FIG. 11 is a front view of a measurement position presentation guide according to a second embodiment.

Next, a second embodiment will be described with reference to FIG. 11. FIG. 11 is a front view of a measurement position presentation guide 9A of the second embodiment. Although a process of cutting out a portion (cutout line) corresponding to the measurement region 31 and the position alignment region 35 from the recording medium 37 is performed at the time of manufacture of the measurement position presentation guide 9 in the first embodiment, the cutout process is omitted in the second embodiment.

As illustrated in FIG. 11, the measurement position presentation guide 9A is manufactured by printing the image based on the print image data 12 subjected to the process in the measurement region determination unit 20 and the position alignment region determination unit 22 described above on the transparent recording medium 37A having optical transmittance in the printing unit 23. Therefore, the measurement position presentation guide 9A basically has the same configuration as the measurement position presentation guide 9 of the first embodiment except that the portion corresponding to the measurement region 31 and the position alignment region 35 is formed in a transparent region surrounded by a line frame. Accordingly. Units of which functions and configurations are same as those in the first embodiment are denoted with the same reference numerals and description thereof will be omitted.

The transparent recording medium 37A may be a recording medium through which the print material 14 can be viewed when the recording medium is placed on the print material 14, that is, a transparent or semi-transparent recording medium causing the print material 14 to be viewed through. For example, paper having a small thickness such as tracing paper may be used.

In the measurement position presentation guide 9A, a portion corresponding to at least the measurement region 31 and the position alignment region 35 is a transparent region. Therefore, when the measurement position presentation guide 9A is placed on the print material 14 in the color measurement device 16, the operator can view the print material 14 through the transparent region. Thus, since the operator can confirm the position of the edge E of the image of the print material 14 through the transparent region corresponding to the position alignment region 35, position alignment between the measurement position presentation guide 9A and the print material 14 can be performed, as in the first embodiment. When the position alignment between the measurement position presentation guide 9A and the print material 14 is made, each measurement region 31 of the print material 14 can be presented to the operator through the transparent region corresponding to the measurement region 31 of the measurement position presentation guide 9A.

In the second embodiment, the color measurement device 41 performs the color measurement for the measurement region 31 of the print material 14 through the transparent region (transparent recording medium 37A) of the measurement position presentation guide 9A. Therefore, the color measurement value obtained by the color measurement device 41 is a color measurement value of the measurement region 31 of the print material 14 obtained through the transparent recording medium 37A. Therefore, the color measurement value of the measurement region 31 of the print material 14 is obtained by subtracting the change in color measurement value due to the transparent recording medium 37A from the color measurement value obtained by the color measurement device 41. Specifically, as described below, a color measurement value of the measurement region 31 is obtained through adaptation of a method (reading a protective film as a transparent recording medium) disclosed in JP2011-075304A that is a prior application of the present applicant regarding color prediction for a print material with a protective film.

<Method of Calculating Color Measurement Value>

If a spectral reflectance of the print material 14 is Rg, a spectral reflectance on the transparent recording medium 37A (measurement position presentation guide 9A) placed on the print material 14 is R, a specular reflectance of an intrinsic optical property value of the transparent recording medium 37A is R∞, a scattering coefficient is S, and a thickness is x, a relationship between R and Rg can be expressed as Equation (1) below using a Kubelka-Munk theory. The parameters are functions of a wavelength and are expressed as Equation (1) below for each wavelength, but notations are omitted.

[Equation 1]

$$R = \frac{\frac{1}{R_\infty}(R_g - R_\infty) - R_\infty\left(R_g - \frac{1}{R_\infty}\right)\exp\left\{Sx\left(\frac{1}{R_\infty} - R_\infty\right)\right\}}{(R_g - R_\infty) - \left(R_g - \frac{1}{R_\infty}\right)\exp\left\{Sx\left(\frac{1}{R_\infty} - R_\infty\right)\right\}} = \tag{1}$$

$$KM(Rg, R\infty, Sx)$$

Here, R∞ and Sx (a product of a scattering coefficient S and a thickness x) in Equation (1) can be obtained in advance on the basis of a spectral reflectance in a state in which the transparent recording medium 37A is placed on at least two types of bases (white and black patch) and a state in which the transparent recording medium 37A is not placed (see JP2011-075304A). Thus, if the spectral reflectance R on the transparent recording medium 37A placed on the print material 14 is measured and known, an unknown value is only Rg. Therefore, the spectral reflectance Rg (color measurement value of the measurement region 31) of the print material 14 obtained by subtracting an influence of the transparent recording medium 37A according to Equation (1) above can be obtained.

Even in a case where the measurement position presentation guide 9A of the second embodiment is used as above, the same effects as those described in the first embodiment can be obtained since the measurement position is fixed by the measurement position presentation guide 9A.

Although the process of cutting out the portion corresponding to the measurement region 31 and the position alignment region 35 from the transparent recording medium 37A is omitted in the second embodiment, the process of cutting out the portion corresponding to the measurement region 31 and the position alignment region 35 may be performed, as in the first embodiment.

[Third Embodiment]

Figure 12:
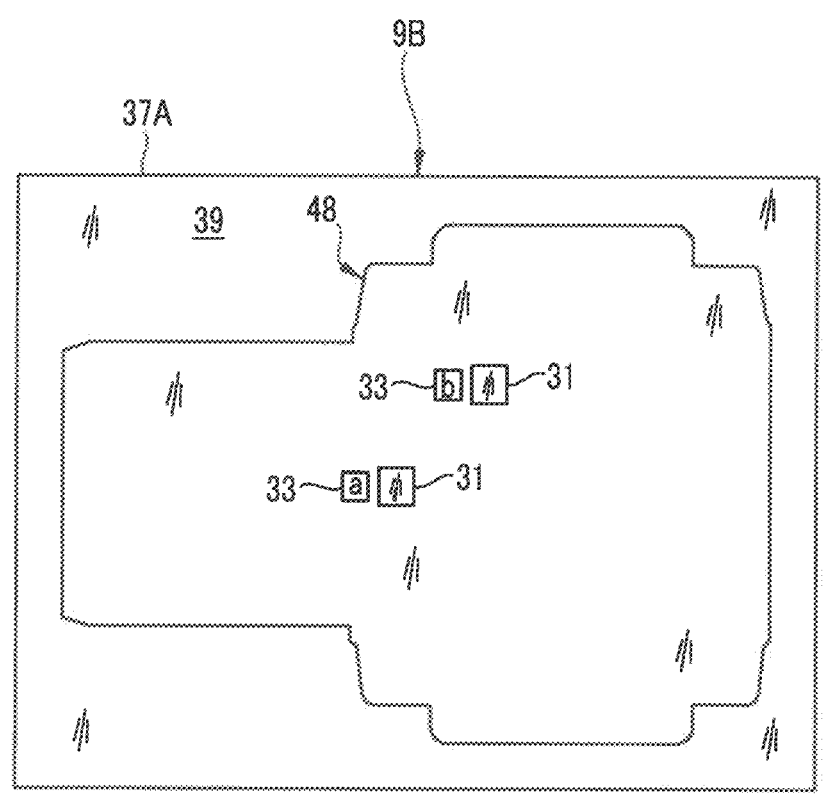
FIG. 12 is a front view of a measurement position presentation guide according to a third embodiment.

Next, a measurement position presentation guide 9B of a third embodiment will be described with reference to FIG. 12. FIG. 12 is a front view of the measurement position presentation guide 9B.

In the second embodiment, the image based on the print image data 12 is printed on a transparent recording medium 37A to manufacture the measurement position presentation guide 9A. On the other hand, in the third embodiment, edge image data obtained by extracting an edge E of a contour from the image on the basis of the print image data 12 is generated, and an edge image 48 based on the edge image data is printed on the transparent recording medium 37A to manufacture the measurement position presentation guide 9B, as illustrated in FIG. 12. Units of which functions and configurations are same as those in the first and second embodiments are denoted with the same reference numerals and description thereof will be omitted.

Although a line frame indicating a portion corresponding to the measurement region 31 is included in the edge image 48, the line frame indicating the portion corresponding to the position alignment region 35 described above is not included. Although generation of the edge image data is performed by the printing unit 23 (see FIG. 1) in this embodiment, an edge image data generation unit that generates edge image data may be separately added.

In the measurement position presentation guide 9B, an almost entire surface is a transparent region. When the measurement position presentation guide 9B is placed on the print material 14 in the color measurement device 16, the operator can view the print material 14 through the measurement position presentation guide 9B. Thus, the operator can perform position alignment between the edge image 48 printed on the measurement position presentation guide 9B and the edge of the image printed on the print material 14. That is, it is possible to perform the position alignment between the measurement position presentation guide 9B and the print material 14. Therefore, it is not necessary for the position alignment region 35 to be formed in the measurement position presentation guide 9B, as in the measurement position presentation guide 9A of the second embodiment (see FIG. 11). Therefore, the position alignment region determination unit 22 (see FIG. 1) of the guide manufacturing device 10 is also unnecessary.

Hereinafter, if the position alignment between the measurement position presentation guide 9B and the print material 14 is made, each measurement region 31 of the print material 14 can be presented to the operator through the transparent region corresponding to the measurement region 31 of the measurement position presentation guide 9B, as in the second embodiment described above. Further, it is possible to perform color measurement of the measurement region 31 of the print material 14 through the transparent region (transparent recording medium 37A) of the measurement position presentation guide 9B using the color measurement device 41, as in the second embodiment described above.

Since the measurement position is fixed by the measurement position presentation guide 9B even in a case where the measurement position presentation guide 9B of the third embodiment is used as above, the same effects as those described in the first embodiment can be obtained.

Although the process of cutting out the portions corresponding to the measurement region 31 and the position alignment region 35 from the transparent recording medium 37A is omitted in the third embodiment, the process of cutting out the portions corresponding to the measurement region 31 and the position alignment region 35 may be performed as in the first embodiment.

[Fourth Embodiment]

Next, a fourth embodiment will be described. The operator manually performs the determination of the measurement region 31 at the time of manufacture of the measurement position presentation guide 9 in the first embodiment, whereas the determination of the measurement region 31 is automatically performed in the fourth embodiment.

Figure 13:
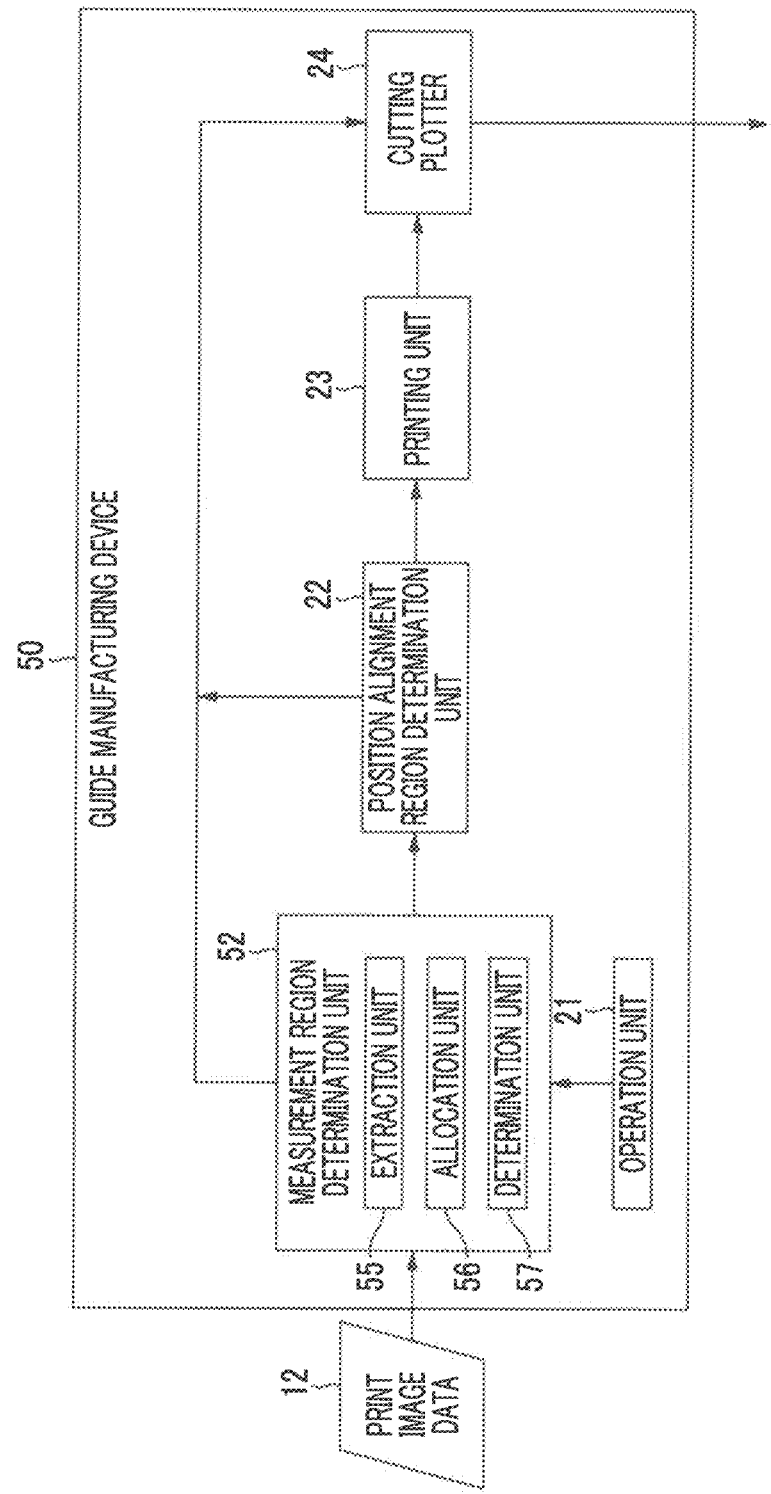
FIG. 13 is a schematic diagram of a guide manufacturing device according to a fourth embodiment.

FIG. 13 is a schematic diagram of a guide manufacturing device 50 in the fourth embodiment. As illustrated in FIG. 13, the guide manufacturing device 50 has basically the same configuration as the guide manufacturing device 10 of the first embodiment except that a measurement region determination unit 52 different from that in the first embodiment is included. Therefore, units of which functions and configurations are same as those in the first embodiment are denoted with the same reference numerals and description thereof will be omitted.

The measurement region determination unit 52 automatically performs a determination of the measurement regions 31 by analyzing the print image data 12. For example, a "measurement region automatic addition button" or the like may be provided to the GUI illustrated in FIG. 3 described above, and when the "measurement region automatic addition button" is clicked, the determination of the measurement regions 31 in the measurement region determination unit 52 may be started.

An extraction unit 55 that extracts a measurement candidate region 54 (see FIG. 15) that is a candidate of the measurement region 31 from the print image data 12, an allocation unit 56 that determines the number of measurement regions 31 allocated to each measurement candidate region 54, and a determination unit 57 that determines positions of the measurement regions 31 corresponding to the number of allocations to each measurement candidate region 54 are provided in the measurement region determination unit 52.

<Process of Extracting Measurement Candidate Region (Group)>

Figure 14:
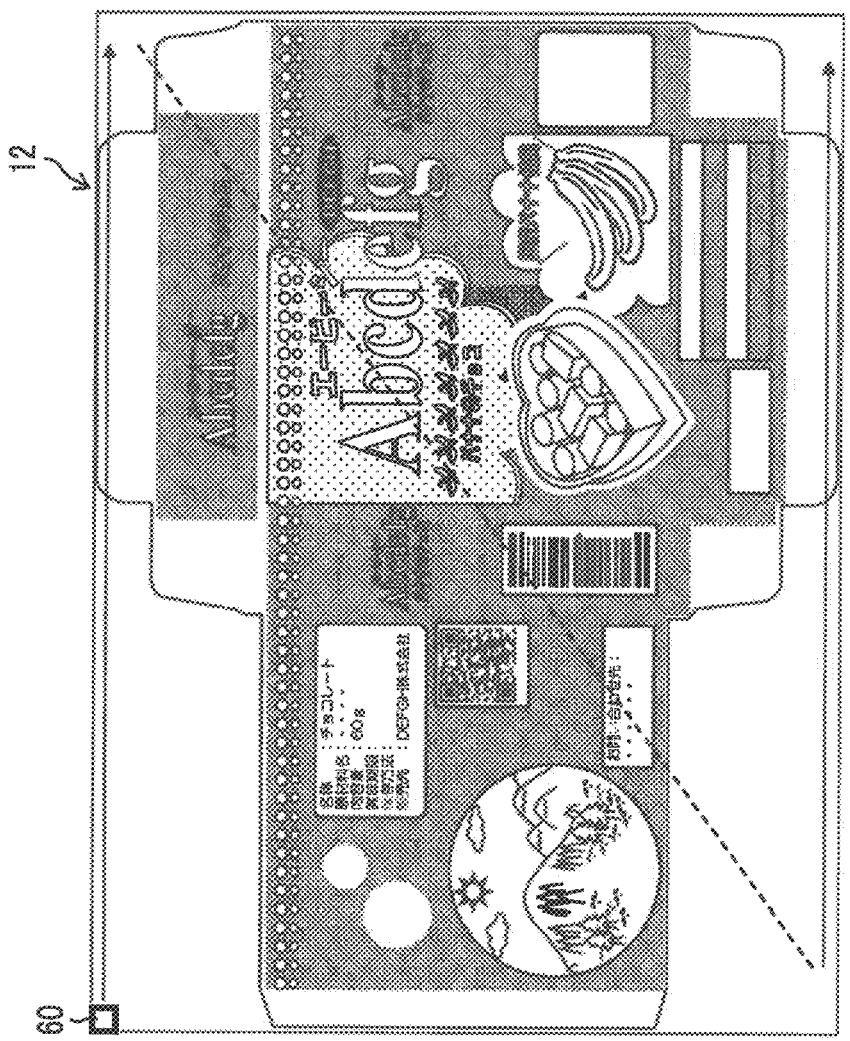
FIG. 14 is an illustrative diagram illustrating a process of extracting an image signal value from print image data in an extraction unit.
Figure 15:
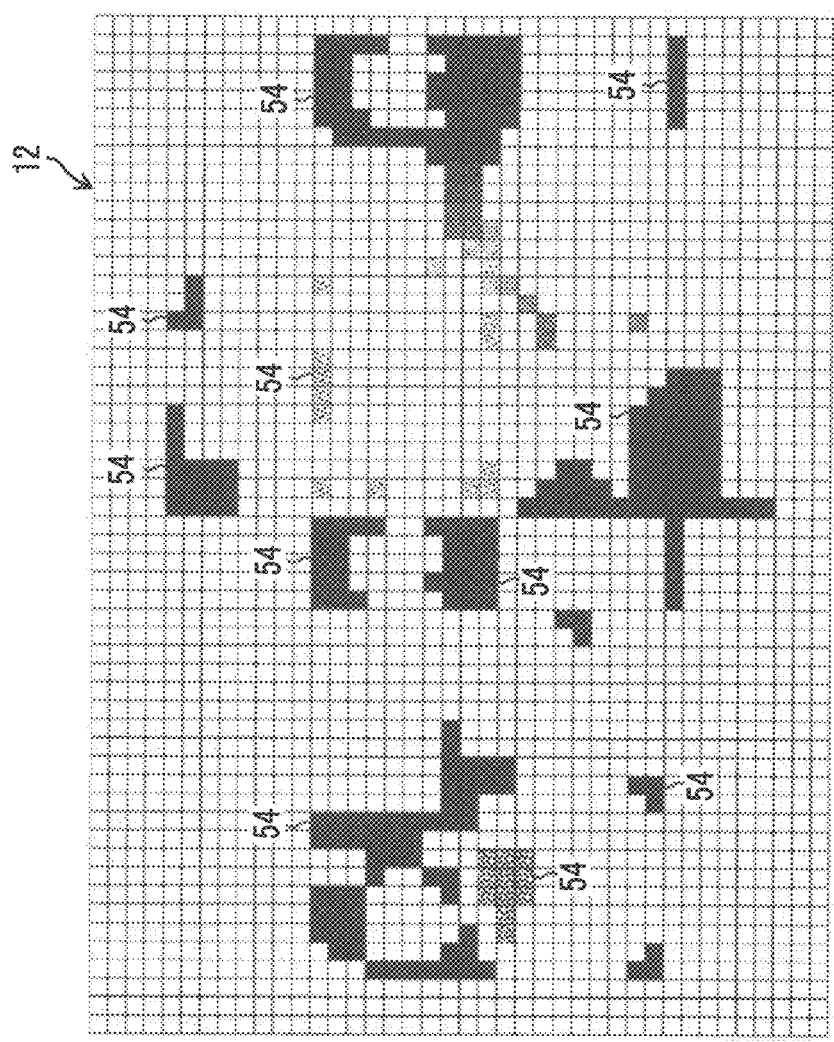
FIG. 15 is an illustrative diagram illustrating a result of extraction of a measurement candidate region in an extraction unit.

FIG. 14 is an illustrative diagram illustrating a process of extracting an image signal value from the print image data 12 in the extraction unit 55, and FIG. 15 is an illustrative diagram illustrating a result of the extraction of the measurement candidate region 54 in the extraction unit 55.

As illustrated in FIG. 14, the extraction unit 55 sets, for example, a region of interest 60 that is a square region having a side equal to or larger an aperture diameter of the color measurement device 41, at an upper left corner in FIG. 14 of the print image data 12, and extracts the image signal value (for example, the average value of the image signal values) in the region of interest 60 from the print image data 12. The extraction unit 55 performs extraction of an image signal value at each position to scan the entire region of the print image data 12 while moving the position of the region of interest 60 on the print image data 12. An arrow and a dotted line in FIG. 14 conceptually show a state in which the position of the region of interest 60 is sequentially moved and the entire region is scanned. The region of interest 60 is an image region having a defined size that is of interest as a calculation target of the process of extracting an image signal value in the extraction unit 55.

A size of the region of interest 60 may be set automatically according to the color measurement device 41 to be used or an operator may designate the size using an operation unit 21 or the like. The region of interest 60 may not be a square shape, and may be a region in an arbitrary shape that is equal to or greater than an aperture size of the color measurement device 41 or may be, for example, a rectangular or circular shape. Further, the regions of interest 60 are arranged to be adjacent without overlapping each other, that is, each position of the region of interest 60 is set as a position at which the regions of interest 60 do not overlap to extract a measurement candidate region 54 to be described below. Alternatively, it staggered so as to overlap by half the region of interest 60, that is, is set to a position overlapping a portion of the region of interest 60 adjacent, may extract a measurement candidate region 54 to be to be described below.

As illustrated in FIG. 15, if extraction of the total regions of the print image data 12 is completed, the extraction unit 55 extracts individual screen tint regions configured with a square region in which the image signal value is uniform (same) (a region having the same size as the region of interest 60), as the measurement candidate regions 54. Thus, the plurality of measurement candidate regions 54, that is, the plurality of measurement candidate regions 54 of which the image signal values in the regions are individually the same in the respective regions are extracted from the print image data 12.

In this case, the region in which there is a change in the image signal value, but color measurement can be performed, for example, a region in which there is a variation in image signal value within a predetermined tolerance value such as a gradual gradation region may be extracted as the measurement candidate region 54. For example, in a case where the print image data 12 is 8-bit image data (0-255), when a range of measurement candidate region 54 is determined, a variation within an allowable value (for example±2) with respect to an average value of the image signal values within the region is allowed. In this case, an average image signal value in the measurement candidate region 54 may be regarded as an image signal value indicating the measurement candidate region 54.

When color measurement of the region in which there is a change in image signal value such as a gradation region is performed in the color measurement device 41, a difference occurs in the average image signal value in the aperture of the color measurement device 41 according to a small difference between positions at which the color measurement device 41 comes in close contact in this region and, as a result, a difference may occur in color measurement value. However, in this embodiment, since the color measurement device 41 can be brought into close contact with the designated region by the measurement position presentation guide 9, there is no particular problem.

Thus, the extraction unit 55 analyzes the print image data 12 to extract a plurality of measurement candidate regions 54 of which the image signal value is equal (here, "equal" includes "substantially equal") for each image signal value from the image, and outputs a result of the extraction of the measurement candidate region 54 to the allocation unit 56 (corresponding to a measurement candidate region extraction step of the present invention). Hereinafter, a group of measurement candidate regions 54 of which the image signal value is equal (including within the above-described range of tolerance values) is defined as a "measurement candidate region group".

<First Allocation Processing Method for Number of Measurement Regions>

Referring back to FIG. 13, the allocation unit 56 determines the number of measurement regions 31 to be allocated to the individual measurement candidate region groups in which the image signal values are different on the basis of the result of the extraction of the measurement candidate region 54 input from the extraction unit 55. The allocation unit 56 first determines a total number of measurement regions 31 to be allocated to all the measurement candidate region groups. This total number may be a predetermined number or may be a number set by the operator using the above-described operation unit 21. Further, the total number may be determined according to a size of the print image data 12. For example, the total number is determined to be "5" in a case where the image size of the print image data 12 is an A4 size, and the total number is determined to be "10" in a case where the image size of the print image data 12 is an A3 size.

Then, the allocation unit 56 determines the number of measurement regions 31 to be allocated to each measurement candidate region group according to the area proportion of each measurement candidate region group (a percentage of the measurement candidate region group in the print image data 12). For example, the allocation unit 56 may simply determine the number of measurement regions 31 to be allocated to each measurement candidate region group according to the area proportion. Further, in this case, if the allocation unit 56 may simply determine the number of measurement regions 31 to be allocated to each measurement candidate region group according to the area proportion, the measurement region 31 may not be allocated to the measurement candidate region group (measurement candidate region 54) having a small area proportion but important color (for example, corporate color or product logo). Therefore, the allocation unit 56 allocates the measurement region 31 to the measurement candidate region groups one by one, and allocates the remaining measurement regions 31 according to the area proportions for the measurement candidate region groups.

For example, a case where a total number of allocations of the measurement regions 31 is 5, and the measurement regions 31 are allocated to a first measurement candidate region group of red, a second measurement candidate region group of green, and a third measurement candidate region group of blue will be described by way of example. In a case where areas ratio of the first measurement candidate region group, the second measurement candidate region group, and the third measurement candidate region group are 84%, 9%, and 7%, respectively, the allocation unit 56 allocates one measurement region 31 to each measurement candidate region. Subsequently, the allocation unit 56 allocates the two remaining measurement regions to the first measurement candidate region group. That is, three measurement regions 31, one measurement region 31, and one measurement region 31 are allocated to the first measurement candidate region group, the second measurement candidate region group, and the third measurement candidate region group. The allocation unit 56 outputs a result of the allocation of the measurement regions 31 to each measurement candidate region group to the determination unit 57.

Here, in a case where there are a large number of measurement candidate region groups (screen tint regions) of which the image signal values are similar, if the number of measurement regions 31 to be allocated is determined according to the area proportion of each measurement candidate region group as described above, the number of measurement regions 31 to be allocated to the measurement candidate region group having a low area proportion, but having important color is reduced or not allocated. That is, a significant imbalance may arise in the number of measurement regions 31 to be allocated to each of the measurement candidate region groups of which the image signal values are different from one another (not similar). Therefore, the number of measurement regions 31 to be allocated to each of the measurement candidate region groups may be determined using the following method.

<Second Allocation Processing Method of Number of Measurement Regions>

Figure 16:
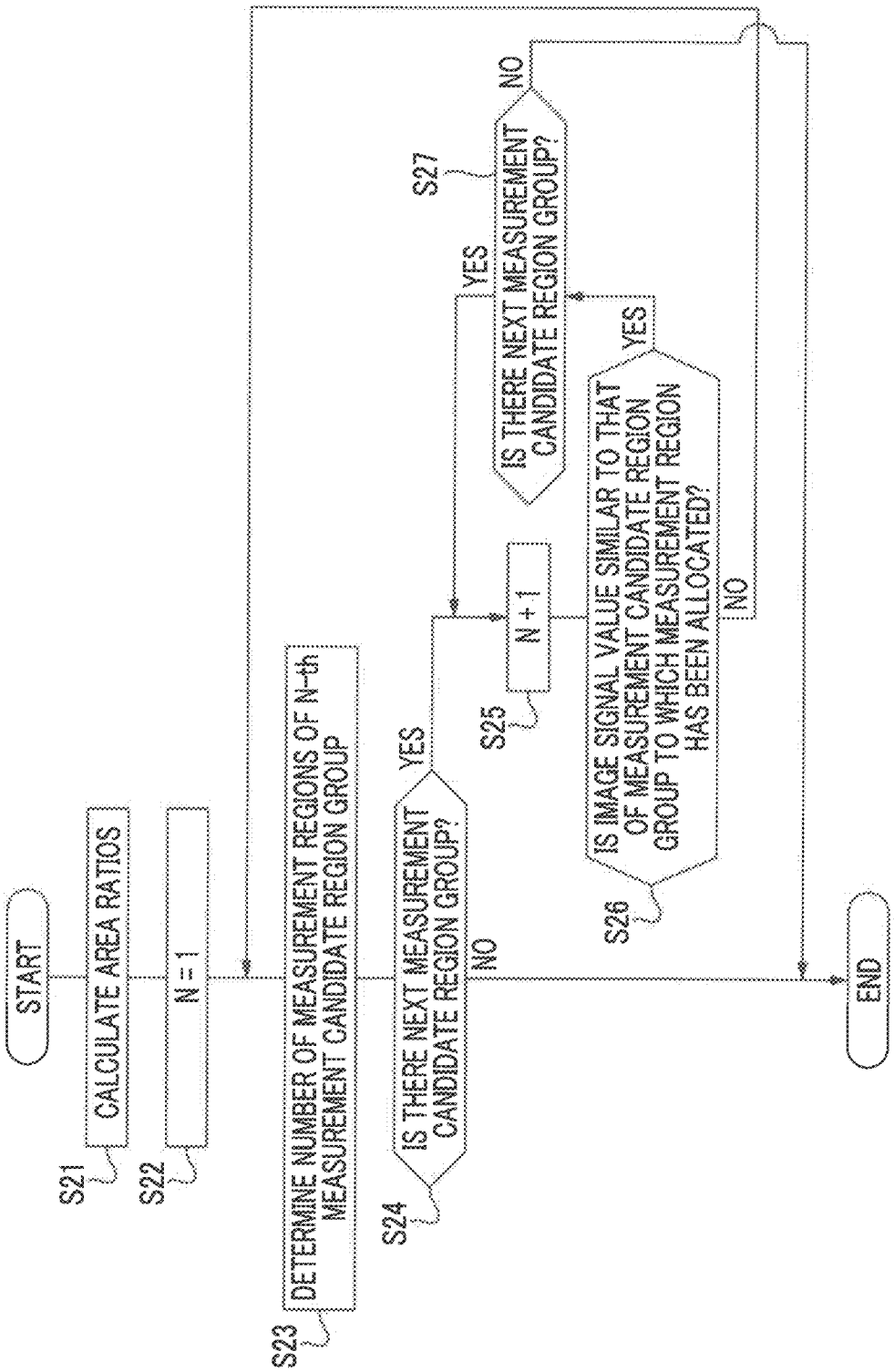
FIG. 16 is a flowchart illustrating a flow of a second allocation processing method of determining the number of allocations of measurement regions to each measurement candidate region group.

FIG. 16 is a flowchart illustrating a flow of a second allocation processing method of determining the number of allocations of the measurement regions 31 to each measurement candidate region group. As illustrated in FIG. 16, after extraction of the measurement candidate region 54 in the above-described extraction unit 55 (corresponding to a candidate region extraction step of the present invention), the allocation unit 56 acquires a result of the extraction of the measurement candidate region 54 from the extraction unit 55. The allocation unit 56 obtains area proportions of the respective measurement candidate region groups, and sets a first measurement candidate region group, a second measurement candidate region group, . . . in an order from the measurement candidate region groups with a high area proportion (step S21).

Subsequently, the allocation unit 56 determines the number of measurement regions 31 to be allocated in an order from the measurement candidate region group with a high area proportion. First, the allocation unit 56 determines the number of measurement regions 31 to be allocated to the first measurement candidate region group according to the area proportion (steps S22 and S23). If there is the second measurement candidate region group (YES in step S24), the allocation unit 56 determines whether the image signal value of the first measurement candidate region group are similar to the image signal value of the second measurement candidate region group (steps S25 and S26). Here, the allocation unit 56 determines whether both of the image signal values are similar, for example, in a case where the image signal values are within ±10 as 8-bit values.

In a case where the allocation unit 56 determines that both of the image signal values are not similar (NO in step S26), the allocation unit 56 determines the number of measurement regions 31 to be allocated to the second measurement candidate region group determining according to the area proportion (step S23).

On the other hand, in a case where the allocation unit 56 determines that both of the image signal values are similar (YES in step S26), the allocation unit 56 excludes the second measurement candidate region group from a target of allocation into the measurement region 31. Then, in a case where there is a third measurement candidate region group (YES in step S27), the allocation unit 56 determines whether the image signal value of the first measurement candidate region group is similar to the image signal value of the third measurement candidate region group (steps S25 and S26). In a case where the allocation unit 56 determines that both of the image signal values are not similar (NO in step S26), the allocation unit 56 determines the number of measurement regions 31 to be allocated to the third measurement candidate region group according to an area proportion thereof (step S23).

Then, in a case where there is a fourth measurement candidate region group, the allocation unit 56 determines whether the measurement region 31 is allocated to the fourth measurement candidate region group on the basis of whether the image signal value of the fourth measurement candidate region group is similar to the image signal value of each measurement candidate region group to which the measurement region 31 has already been allocated.

Similarly, the allocation unit 56 determines the number of allocations of the measurement region 31 in an order from the measurement candidate region group having a highest area proportion, and excludes the measurement region candidate group of which the image signal value is similar to the measurement candidate region group to which the measurement region 31 has already been allocated, from a target of allocation of the measurement region 31 (corresponding to an allocation step of the present invention).

Even in a case where there are a large number of measurement candidate region groups of which the image signal values are similar to one another, the image signal values of the measurement regions 31 are dispersed while allocating the measurement regions 31 to each measurement candidate region group region 31 with weights according to the area proportion by performing the process of allocating the measurement regions 31. The allocation unit 56 outputs a result of the allocation of the measurement region 31 to each measurement candidate region group to the determination unit 57. In a case where the total number of measurement regions 31 to be allocated to each measurement candidate region group in advance is determined in advance (including a case where the operator sets the total number or a case in which the total number is determined according to the size of the print image data 12), the measurement candidate region group to which the measurement regions 31 are allocate is first determined, and then, the measurement regions 31 may be allocated to the measurement candidate region group to which the allocation has been determined, according to the area proportion thereof or the like. In this case, the allocation of the measurement regions 31 may be performed as described in the first allocation processing methods described above.

<Process of Determining Position of the Measurement Region>

Referring back to FIG. 13, the determination unit 57 determines the positions of the measurement regions 31 corresponding to the number of allocations to the measurement candidate region group by the allocation unit 56 (corresponding to a determination step of present invention). In this case, the determination unit 57 determines the positions of the measurement regions 31 in the measurement candidate region group so that the positions of the measurement regions 31 are dispersed on the print material 14.

Figure 17:
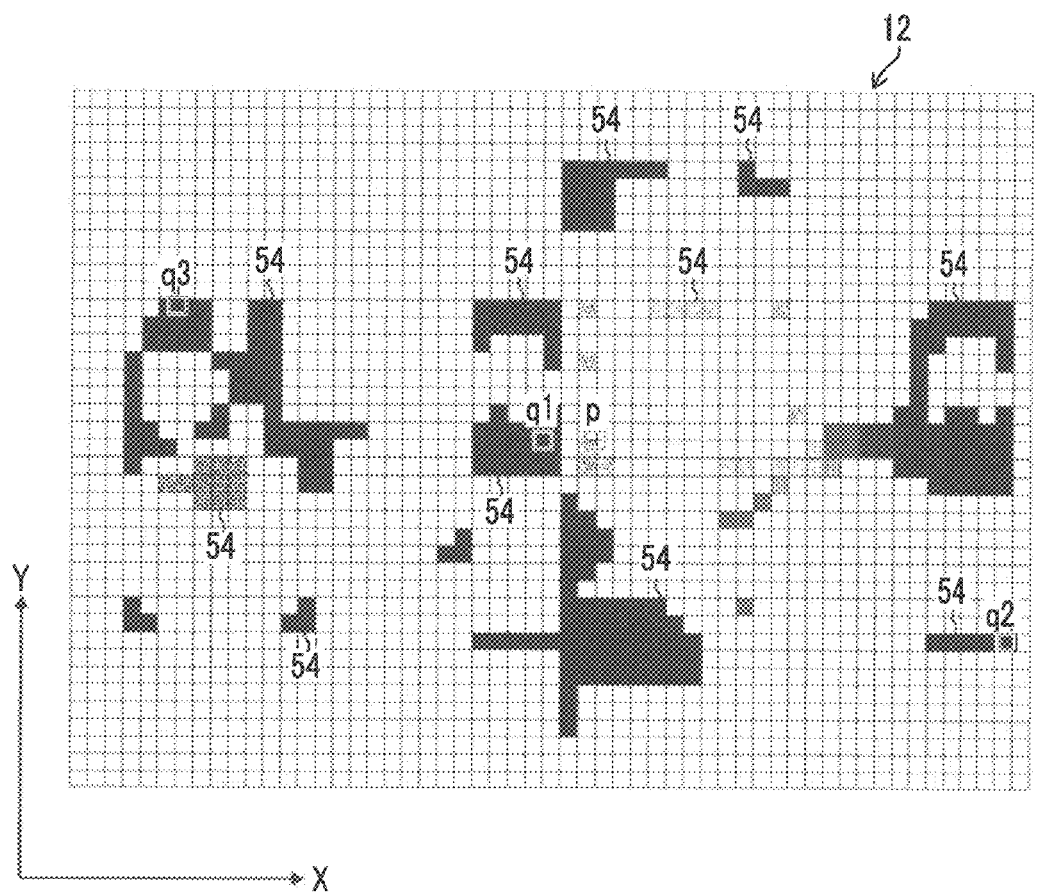
FIG. 17 is an illustrative diagram illustrating a process of determining a position of a measurement region in a determination unit.

FIG. 17 is an illustrative diagram illustrating a process of determining the position of the measurement region 31 in the determination unit 57. Here, a case where the position of the measurement region 31 is determined in the measurement candidate region group of the same image signal value displayed in a black region in FIG. 17 will be described.

As illustrated in FIG. 17, the determination unit 57 obtain a centroid p of the measurement candidate region group. This centroid p can be obtained on the basis of a cross-section first-order moment. Specifically, if the measurement candidate region 54 of the measurement candidate region group is i, central coordinates of i that is a measurement candidate region 54 are (xi, yi), and an area of i that is the measurement candidate region 54 is Ai, coordinates (xg, yg) of the centroid p can be obtained using Equation (2) below.

[Equation 2]

$$xg = \frac{\sum_i yiAi}{\sum_i Ai}, \quad yg = \frac{\sum_i xiAi}{\sum_i Ai} \quad (2)$$

The determination unit 57 sets the measurement candidate region 54 closest to the centroid p which is calculated on the basis of Equation (2) above as a first measurement region 31 (q1 in the figure). The measurement candidate region 54 most distant from the centroid p, the measurement candidate region 54 at a position closest to a predetermined position such as an upper left corner in FIG. 17, the measurement candidate region 54 selected by the operator using, for example, the operation unit 21, or the like may be selected as the first measurement region 31, in place of the measurement candidate region 54 closest to the centroid p.

Then, the determination unit 57 sets a measurement candidate region 54 of which a distance from the first measurement region 31 (q1) in the measurement candidate region group is greatest, as a second measurement region 31 (q2 in the figure). The determination unit 57 sets the measurement candidate region 54 of which a total distance from the first and second measurement regions 31 (q1, q2) in the measurement candidate region group is greatest, as a third measurement region 31 (q3 in the figure). Specifically, if the total distance is d(x, y), a total distance is expressed as shown Equation (3) below.

[Equation 3]

$$d(x, y) = \sum_i \{(x - xi)^2 + (y - yi)^2\} \quad (3)$$

In Equation (3) above, (x, y) indicates coordinates of a center of the region of interest, i indicates a subscript indicating the determined measurement region 31, and (xi, yi) indicates coordinates of a center of the determined measurement region 31 in the measurement candidate region group. The region of interest in which d(x, y) is largest is determined as the next measurement region 31 (q3) in the colorimetric candidate region group.

Then, the determination unit 57 sets the measurement candidate region 54 of which a total distance from the first to third measurement regions 31 (q1, q2, q3) in the measurement candidate region group is greatest, as a fourth measurement region 31 (not illustrated). By repeating this, the determination unit 57 determines the position of the measurement region 31 corresponding to the number of allocations in the allocation unit 56. Further, the determination unit 57 similarly determines the position of the measurement region 31 corresponding to the number of allocations to the other measurement candidate region group. Thus, the position of the measurement region 31 is automatically set.

Thus, the determination unit 57 determines the position of the measurement region 31 in the measurement candidate region group having the same image signal value, such that the positions of the measurement regions 31 can be dispersed in the measurement candidate region group. Thus, even in a case where there is unevenness in a surface of the print material 14, it is possible to acquire a color measurement value obtained by averaging an influence of the unevenness.

The measurement region determination unit 52 performs a process of adding information (for example, a cutout line) indicating the measurement region 31 in each measurement candidate region group and the measurement region information 33 (ID) indicating each measurement region 31 to the print image data 12, as in the first embodiment, after the position of the measurement region 31 in each measurement candidate region group is determined by the determination unit 57. Since a subsequent process is basically the same as in the first embodiment, specific description thereof will be omitted.

<Another Example 1 of Process of Determining Position of Measurement Region>

Then, another example 1 of a process of determining the position of the measurement region 31 in the determination unit 57 will be described. When the total distance is calculated using Equation (3) above, it is considered that there are a plurality of measurement candidate regions 54 in which a total distance d(x, y) becomes the same distance. In this case, the distances of the plurality of measurement candidate regions 54 may be weighted by directionality and re-evaluation may be performed to determine a region of which the weighted distance wd is great as the measurement region 31. Specifically, a weight of an X-direction [(a horizontal direction in FIG. 17 (direction parallel to the X-direction)] is Wx, and a weight of a Y-direction [(a vertical direction in FIG. 17 (direction parallel to the Y-direction) is Wy to calculate a weighted distance wd(x, y) using Equation (4) below.

[Equation 4]

$$wd(x, y) = \sum_i \{Wx(x - xi)^2 + Wy(y - yi)^2\} \quad (4)$$

Here, in Equation (4) above, values of Wx and Wy are different from each other. For example, in a case where Wx=2.0 and Wy=1.0, the distances are re-evaluated, preferentially, in the X-direction. Even when the distances are weighted by the direction in this manner, the measurement candidate regions 54 at the same weighted distances are likely to be on a positive side and a negative side from central coordinates of the region of interest described above. In this case, any one of a positive direction and a negative direction may be preferentially determined. Here, the values of the weights Wx and Wy, and the preferentially determination of any one of the positive direction and the negative direction may be set by the operator using the operation unit 21 or the like or may be determined in advance.

<Another Example 2 of Process of Determining Position of Measurement Region>

Next, another example 2 of the process of determining a position of the measurement region 31 in the determination unit 57 will be described. In the other example 2, the total distance described above is calculated as a weighted distance in the X-direction (horizontal direction) and the Y-direction (vertical direction) from the beginning. Here, a case where the print material 14 that is a measurement target is an offset print material printed by offset printing will be described by way of example.

In offset printing, since the adjustment of an ink supply amount is performed in units of ink keys, variation in the position of the measurement candidate region 54 having the same image signal value easily occurs in the direction perpendicular to the printing direction. Therefore, in the case of an offset print material, it is preferable for the weight of the distance in the direction perpendicular to the printing direction to be great from the beginning. For example, in a case where the print direction is the Y-direction, Wx=2.0, and Wy=1.0. That is, dispersion of the positions of the measurement regions 31 in a predetermined direction (X-direction) is large than in another direction (Y-direction). Thus, when the positions of the plurality of the measurement regions 31 are determined, the positions of the measurement region 31 are determined so that the positions are dispersed in a direction perpendicular to a printing direction, and color measurement such that unevenness of printing is averaged as much as possible can be performed. However, in this case, there may also be a plurality of regions in which the weighted distances are equal. In this case, for example, the weight is increased from Wx=2.0 to 3.0 and is adjusted for sharpness, and then, a weighted distance of the measurement candidate region 54 that is at the same weighted distance is re-evaluated. Here, whether to prioritize which of the positive direction and the negative direction is as described above.

Although the offset print material as the print material 14 has been described by way of example in the other example 2, the weight may be set similar to the offset print material since a variation in the position of the measurement candidate region 54 easily occurs in a direction perpendicular to the printing direction in the print material 14 printed by an inkjet printer of a single pass scheme.

The automatic setting of the positions of the measurement regions 31 described in Embodiment 4 above (including other examples 1 and 2) can be applied when the measurement position presentation guides 9A and 9B are manufactured in the second and third embodiments described above.

Although the position of the next measurement region 31 is determined on the basis of the total distance from the measurement region 31 of which the position determination has been completed in the measurement candidate region group in the fourth embodiment, the position may be determined randomly without the basis of the total distance. That is, each measurement candidate region 54 may be numbered with the random number and the ranking with the number (for example, an ascending order of random numbers or a descending order of random numbers) may be performed, and the measurement region 31 corresponding to the number of measurement points allocated from a higher rank may be determined.

As still another method, the measurement region 31 may be determined randomly on the basis of the distance between the measurement regions 31. The ranking may be performed with a random number on the respective measurement candidate regions 54 as described above, and the measurement candidate region 54 in which the total distance (or total weighted distance) from the measurement region 31 of which the position determination has been completed is greatest among the measurement candidate regions 54 (for example, top 10) within a predetermined rank from a high rank may be determined as the next measurement region 31. Here, "within a predetermined order after random numbering" may be within a predetermined rank or, for example, 1/10 of the number of measurement candidate regions are regions within the predetermined rank according to the number of measurement candidate regions 54. Further, the ranking using the random number may be performed only once at the beginning or, when the next measurement region 31 is determined, the random number may be generated again and ranking may be performed again.

[Fifth Embodiment]

Next, a fifth embodiment will be described. When printing of the print material 14 is performed on the basis of the print image data 12, the size of the image of the print image data 12 and the size of the image printed on the print material 14 on the basis of the print image data 12 may not match. Mismatch between both of the sizes is caused, for example, by various settings at the time of manufacture of a plate when printing of the print material 14 is performed (for example, at the time of manufacture of a flexographic printing plate in a case where flexographic printing is performed) and at the time of printing, or by physical expansion and contraction of the recording medium 37 (transparent recording medium 37A) due to absorption and drying of ink at the time of printing. When such mismatch occur, the position of the measurement region 31 on the print material 14 cannot be accurately specified by the measurement position presentation guide 9 described above. Therefore, in the fifth embodiment, manufacture of the measurement position presentation guide 9 corresponding to the mismatch between the sizes of both is performed.

Figure 18:
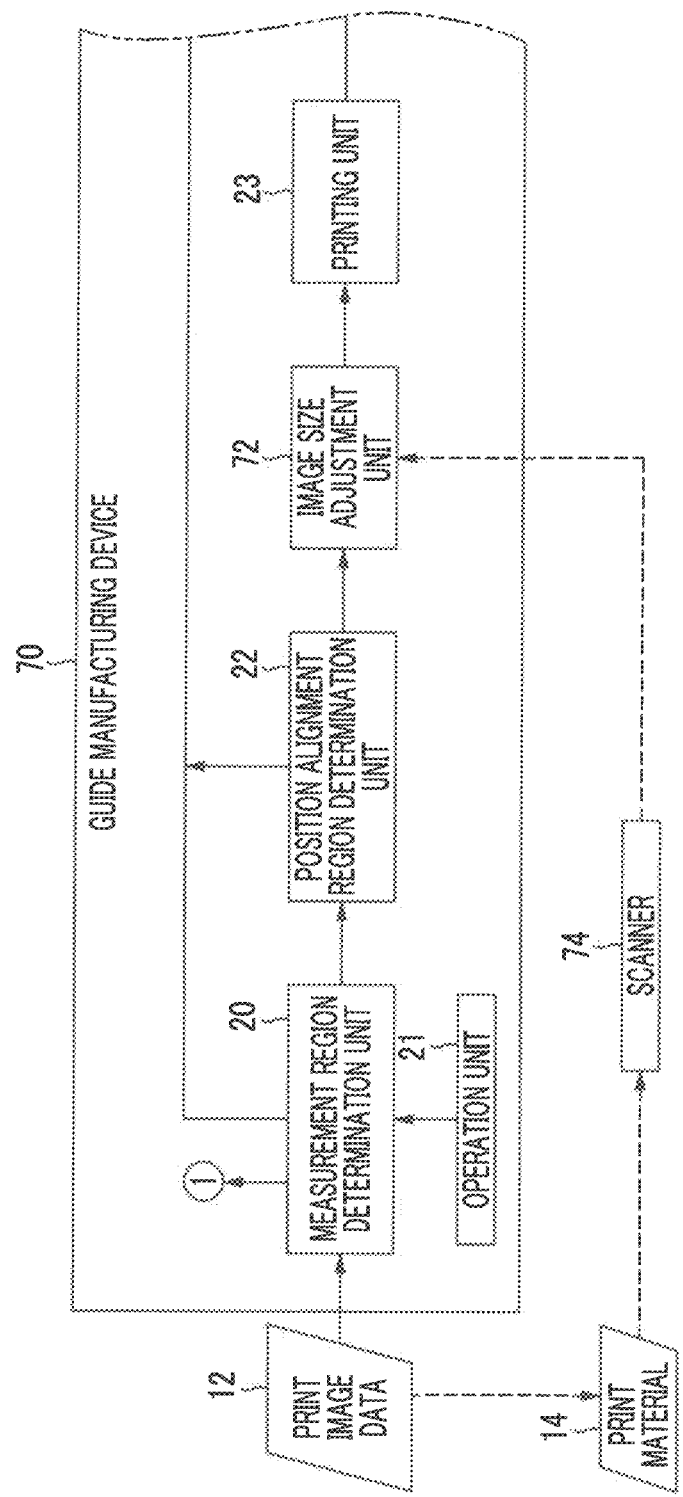
FIG. 18 is a schematic diagram of a guide manufacturing device of to a fifth embodiment.

FIG. 18 is a schematic diagram of a guide manufacturing device 70 of the fifth embodiment. As illustrated in FIG. 18, the guide manufacturing device 70 has basically the same configuration as the guide manufacturing device 10 of the first embodiment except that an image size adjustment unit 72 is provided between the position alignment region determination unit 22 and the printing unit 23. Therefore, units of which functions and configurations are same as those in the first embodiment are denoted with the same reference numerals and description thereof will be omitted.

The image size adjustment unit 72 adjusts the size of the image of the print image data 12 input from the position alignment region determination unit 22 according to the size of the image printed on the print material 14 on the basis of the print image data 12. Specifically, the image size adjustment unit 72 acquires read image data of the image from a scanner 74 which reads the image printed on the print material 14 on the basis of the print image data 12, and analyzes the read image data to acquire the size of the image printed on the print material 14. A measured value obtained by measuring the size of the image printed on the print material 14 in advance may be input to the image size adjustment unit 72.

Then, the image size adjustment unit 72 compares the size of the image of the original print image data 12 with the size of the image printed on the print material 14 to calculate a scaling factor indicating a magnification of expansion and reduction of the latter size with respect to the former size. The image size adjustment unit 72 performs a scaling process (expansion and reduction) on the print image data 12 input from the position alignment region determination unit 22 on the basis of the calculated scaling factor to scale the size of the image of the print image data 12. The print image data 12 after the scaling process is output from the image size adjustment unit 72 to the printing unit 23.

The printing unit 23 prints the image on the recording medium 37 on the basis of the print image data 12 after the scaling process. Hereinafter, the cutting plotter 24 performs a process of cutting out the recording medium 37, as in the first embodiment described above. In this case, the cutting plotter 24 performs a process of cutting out portions corresponding to the measurement region 31 and the position alignment region 35 after the scaling process on the basis of the scaling factor calculated by the image size adjustment unit 72. Thus, the measurement position presentation guide 9 on which the image having a size corresponding to the size of the image on the print material 14 has been printed is obtained.

At the time of the manufacture of the measurement position presentation guide 9, in a case where the size of the print image data 12 and the size of the image printed on the recording medium 37 do not match, the scaling process in the image size adjustment unit 72 may be executed in consideration of a scaling factor obtained by comparing both of the sizes, similar to the time of printing of the print material 14.

Further, although the scaling process is performed on the print image data 12 input from the position alignment region determination unit 22 in the fifth embodiment, the scaling process may be performed on the print image data 12 before input to the guide manufacturing device 10 and a timing of performing the scaling process is not particularly limited.

Further, the scaling process for the print image data 12 described in the fifth embodiment can also be applied to the manufacture of the measurement position presentation guide of the second embodiment to fourth embodiment described above.

[Modification Example of Measurement Position Presentation Guide]

Figure 19:
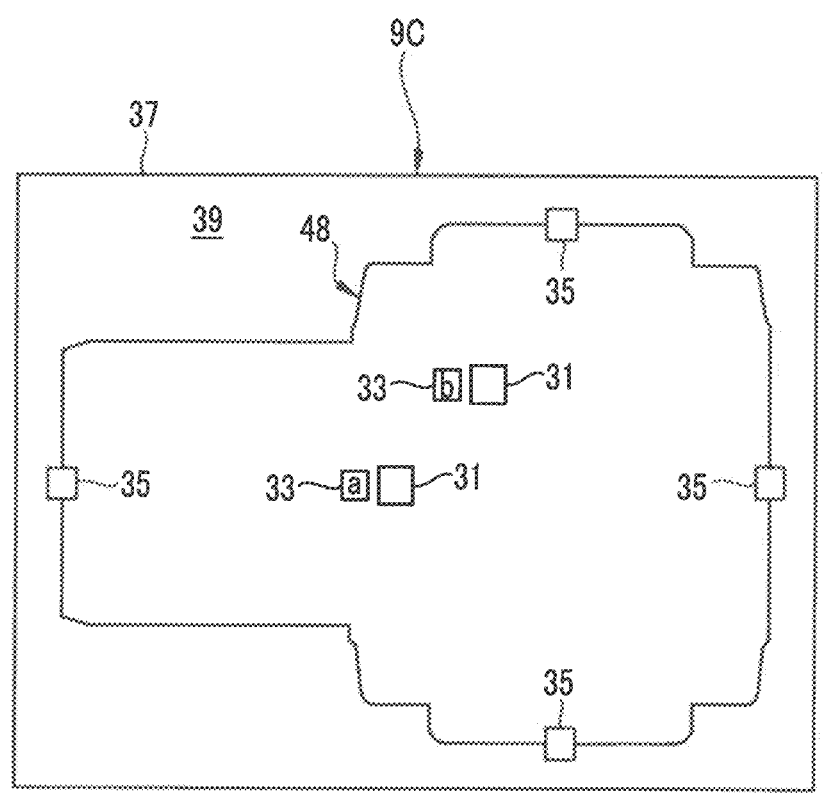
FIG. 19 is a front view of a measurement position presentation guide which is a modification example of the measurement position presentation guide of the third embodiment.

Although the case where the edge image 48 based on the edge image data is printed on the transparent recording medium 37A has been described by way of example in the third embodiment (see FIG. 12), this edge image 48 may be printed on the recording medium 37 described in the first embodiment or the like. FIG. 19 is a front view of a measurement position presentation guide 9C that is a modification example of the measurement position presentation guide 9B of the third embodiment. As illustrated in FIG. 19, the measurement position presentation guide 9C is manufactured by printing the edge image 48 on the recording medium 37 and cutting out the portion corresponding to the measurement region 31 and the position alignment region 35 from the recording medium 37.

[Color Measurement Device of Sixth Embodiment]

<Entire Configuration of Color Measurement Device>

Figure 20:
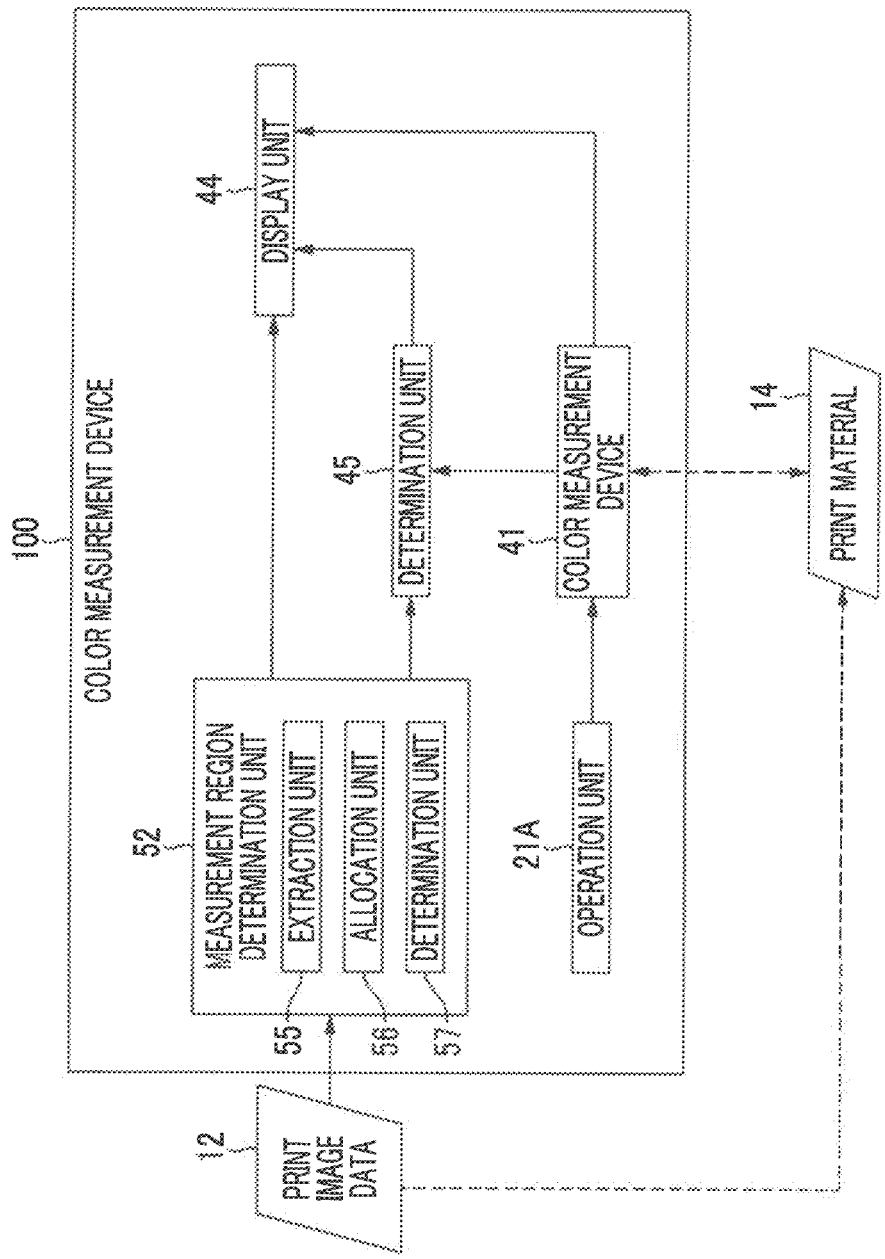
FIG. 20 is a schematic diagram of a color measurement device of a sixth embodiment.

FIG. 20 is a schematic diagram of a color measurement device 100 corresponding to the apparatus for determining a measurement position of a print material for achieving the second object of the present invention. In each embodiment described above, the measurement region 31 (also referred to as a measurement position or a color measurement position) on the print material 14 is present to the operator using the measurement position presentation guide, whereas the color measurement device 100 performs color measurement (corresponding to measurement of quality of the present invention) of the print material 14 printed on the basis of the print image data 12, and presents the measurement region 31 in the print material 14 to the operator when the color measurement is performed. Units of which functions and configurations are same as those in each embodiment are denoted with the same reference numerals and description thereof will be omitted.

As illustrated in FIG. 20, the color measurement device 100 roughly includes an operation unit 21A, a color measurement device 41, a measurement region determination unit 52, a display unit 44, and a determination unit 45. In this embodiment, each unit other than the color measurement device 41 is realized, for example, by a computing unit and a monitor of a personal computer or the like.

The operation unit 21A is used to input a colorimetric operation such as start or stop of color measurement of the print material 14 in the color measurement device 100. As this operation unit 21A, various input interfaces such as a keyboard, a mouse, and a touch panel may be used, similar to the above-described operation unit 21 (see FIG. 1).

The color measurement device 41 of the sixth embodiment is basically the same as the color measurement device 41 (see FIG. 7) described in the above first embodiment. The color measurement device 41 receives a measurement start instruction from the operation unit 21A in a state in which the color measurement device 41 comes in contact with the measurement position of the print material 14 through a manual operation of the operator, and performs the color measurement for the measurement position of the print material 14 to acquire the color measurement value of the measurement position.

The measurement region determination unit 52 in the sixth embodiment is basically the same as the measurement region determination unit 52 described in the fourth embodiment, and acquires the print image data 12 from the outside of the color measurement device 100 and analyzes the print image data 12 to automatically determine the measurement region 31 indicating the measurement position at which the color measurement is performed in the print image data 12. In this embodiment, by causing a central processing unit (CPU) of a personal computer to execute a predetermined measurement control program, the CPU partially functions as the measurement region determination unit 52 and the determination unit 45.

<Determination of Measurement Region>

The extraction unit (corresponding to a candidate region extraction unit of the present invention) 55, the allocation unit 56, and the determination unit 57 described in the fourth embodiment are provided in the measurement region determination unit 52. Further, although not illustrated, an acquisition unit (various interfaces) that acquires the print image data 12 from the outside of the color measurement device 100 are provided in the measurement region determination unit 52.

(Process of Extracting Measurement Candidate Region (Group))

The extraction unit 55 of the sixth embodiment performs the extraction of the image signal value at each position to scan the entire region of the print image data 12 while moving the position of the region of interest 60 on the print image data 12 to extract a plurality of measurement candidate regions 54 described above from the print image data 12, as described in the fourth embodiment (see FIGS. 14 and 15) described above. The extraction unit 55 outputs a result of the extraction of the measurement candidate region 54 to the allocation unit 56.

(Method of Processing Allocation of Measurement Region)

The allocation unit 56 of the sixth embodiment determines the number of allocations of the measurement region 31 in an order from the measurement candidate region group having a highest area proportion, and excludes the measurement region candidate group of which the image signal value is similar to the measurement candidate region group to which the measurement region 31 has already been allocated, from a target of allocation of the measurement region 31, as described in the fourth embodiment described above (second allocation processing method for the number of measurement regions: see FIG. 16). The allocation unit 56 outputs a result of the allocation of the measurement region 31 in each measurement candidate region group to the determination unit 57.

In a case where a total number of measurement regions 31 allocated to each measurement candidate region group in advance is determined in advance (including a case where the operator sets), the measurement region 31 may be allocated to the measurement candidate region group to which the allocation has been determined, according to an area proportion thereof or the like, after the measurement candidate region group to which the measurement region 31 is allocated is first determined. The total number may be determined according to a size of the print image data 12. For example, the total number is determined to be "5" in a case where the image size of the print image data 12 is an A4 size, and the total number is determined to be "10" in a case where the image size of the print image data 12 is an A3 size.

In this case, if the measurement region is simply allocated to the measurement candidate region group to which the allocation of the measurement region 31 has been determined, according to the area proportion thereof or the like, the measurement region 31 may not be allocated to the measurement candidate region group (measurement candidate region 54) having a small area proportion but important color (for example, corporate color or product logo). Therefore, the allocation unit 56 allocates the measurement region 31 to the measurement candidate region groups to which the allocation of the measurement region 31 has been determined one by one, and allocates the remaining measurement regions 31 according to the area proportions for the measurement candidate region groups.

(Process of Determining Position of Measurement Region)

The determination unit 57 of the sixth embodiment determines the positions of the measurement regions 31 corresponding to the number of allocations to the measurement candidate region group by the allocation unit 56, as described in the process of determining the position of the measurement region in the fourth embodiment described above (see FIG. 17), the other embodiment 1 of the process of determining the position of the measurement region, and the other embodiment 2 of the process of determining the position of the measurement region.

(Processing of Print Image Data)

Figure 21:
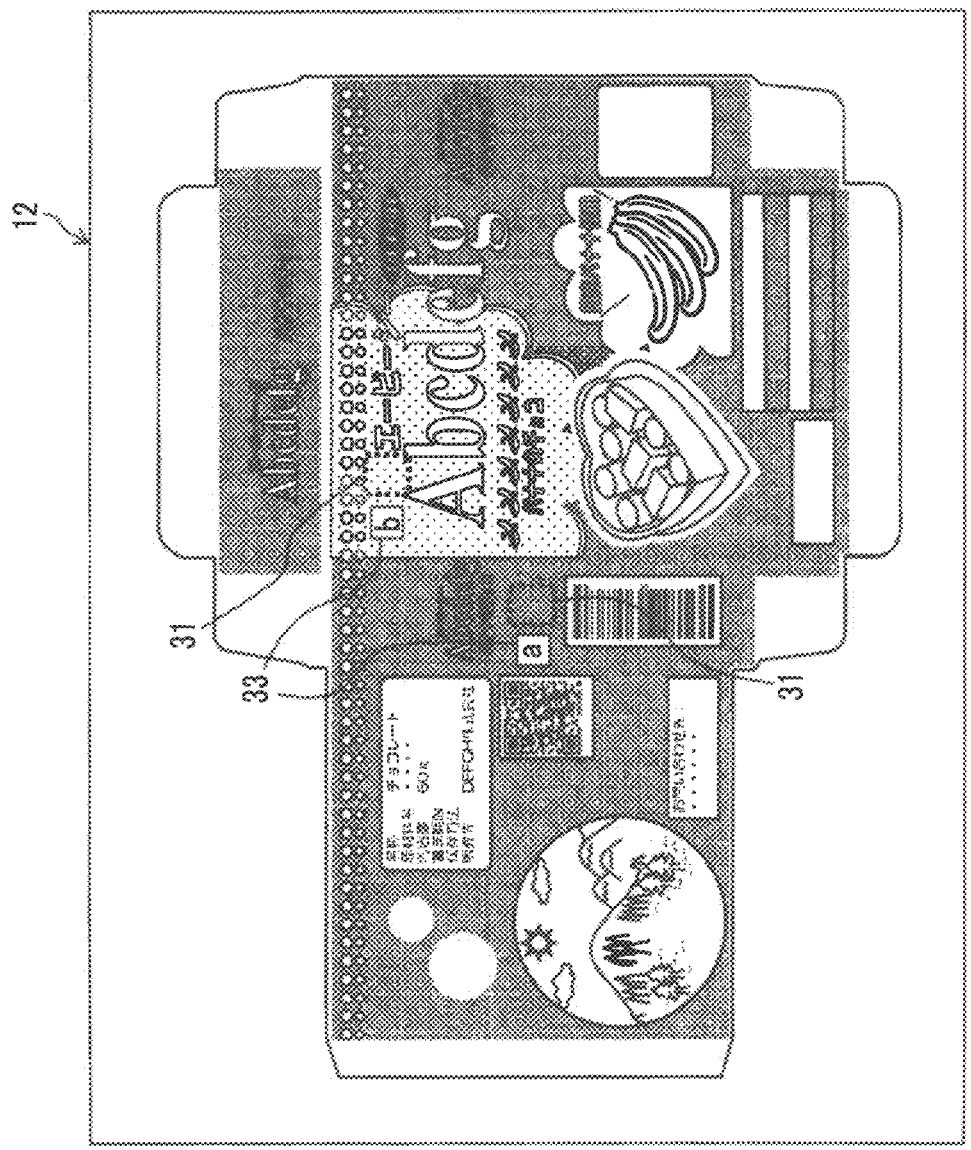
FIG. 21 is an illustrative diagram illustrating print image data after a determination of a position of a measurement region for each measurement candidate region group.

FIG. 21 is an illustrative diagram illustrating the print image data 12 after the position of the measurement region 31 in each measurement candidate region group is determined. As illustrated in FIG. 21, the determination unit 57 performs a process of adding information capable of specifying the determined position of the measurement region 31 (frame information indicated by a dotted line in this embodiment) to the print image data 12 after the position of the measurement region 31 in each measurement candidate region group is determined. In FIG. 21 (similar to FIG. 22 and subsequent similar figures), only two measurement regions 31 are shown as a representative example of the measurement region 31 in order to prevent complication of the drawings.

Further, the determination unit 57 performs the process of adding the measurement region information 33 illustrated in FIG. 6 of the first embodiment to the print image data 12. Then, the determination unit 57 outputs the print image data 12 subjected to the process of adding the frame information and the measurement region information 33 to the display unit 44.

<Display of Graphical User Interface (GUI) for Color Measurement Operation in Display Unit>

The display unit 44 of the sixth embodiment displays a GUI for a color measurement operation when the color measurement in the color measurement device 41 is performed, on the basis of the print image data 12 acquired from the measurement region determination unit 52 and the frame information and the measurement region information 33 added to the print image data 12.

Figure 22:
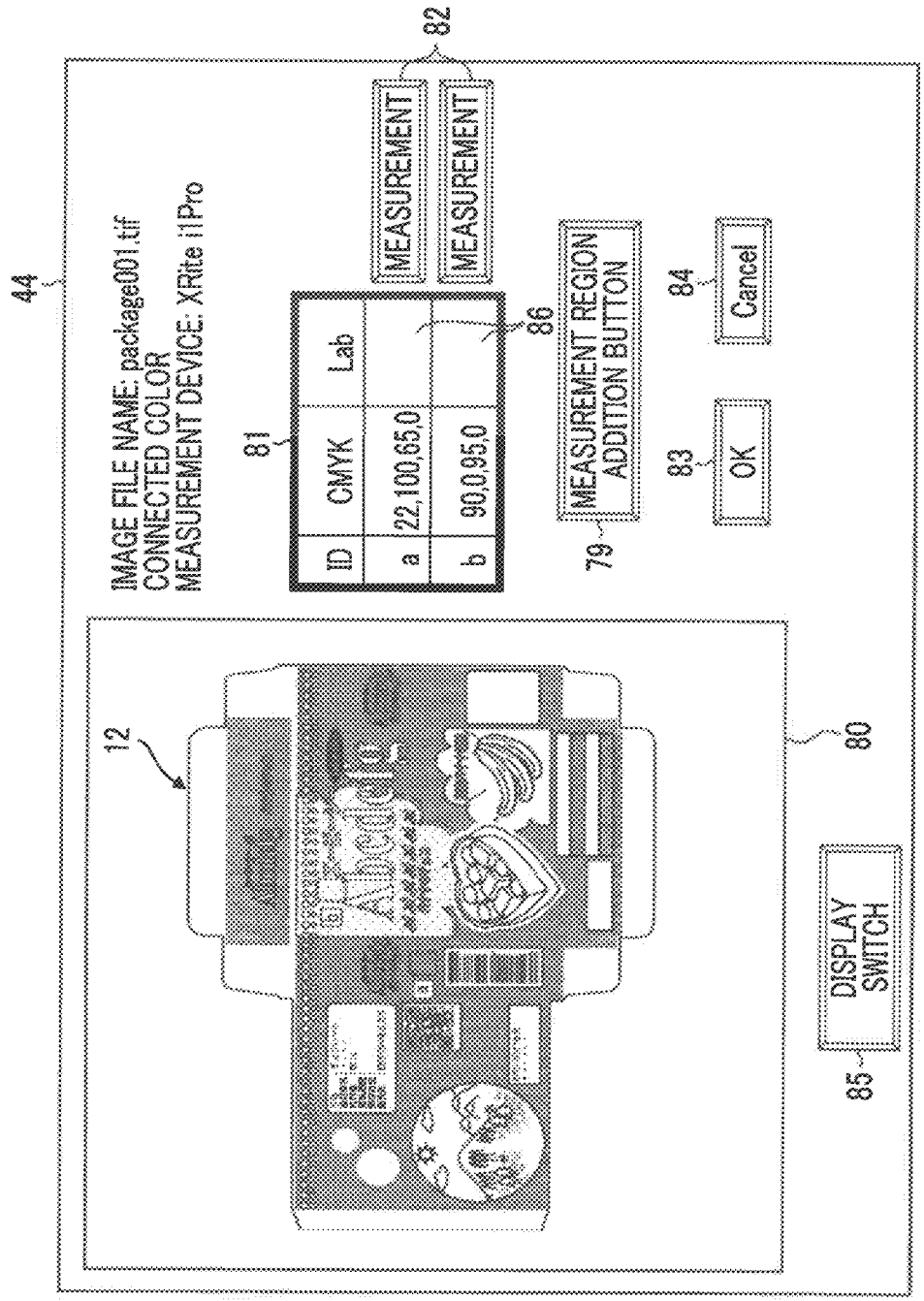
FIG. 22 is an illustrative diagram illustrating an example of a GUI for a color measurement operation displayed on a display unit.

FIG. 22 is an illustrative diagram illustrating an example of a GUI for a color measurement operation displayed on the display unit 44. As illustrated in FIG. 22, a measurement region addition button 79 and a display switching button 85 are included in the GUI displayed on the display unit 44, in addition to the image display field 80, the measurement region display field 81, the measurement button 82, the OK button 83, the cancel button 84, the cell 86, the file name of the print image data 12, and the model name of the color measurement device 41 illustrated in FIG. 8 in the first embodiment. The GUI displayed on the display unit 44 is not limited to the example illustrated in FIG. 22, and may be appropriately changed.

The measurement region addition button 79 is a button for starting the process of determining the measurement region 31 in the measurement region determination unit 52. When the measurement region addition button 79 is clicked, the measurement region determination unit 52 acquires and analyzes the print image data 12. Accordingly, the print image data 12 subjected to the process of adding the frame information and the measurement region information 33 is output from the measurement region determination unit 52 to the display unit 44.

The image corresponding to the print material 14 is displayed in the image display field 80 on the basis of the print image data 12. Further, since the frame information and the measurement region information 33 (ID) are included in the image as in the first embodiment described above, the measurement region 31 on the print material 14 may be presented to the operator.

The measurement region display field 81 includes an ID field and a Lab field, as in the first embodiment described above. As in the first embodiment, the measurement button 82 is a GUI button for instructing execution of color measurement in the color measurement device 41, the OK button 83 is a button for performing an instruction to complete color measurement in the color measurement device 41, and the cancel button 84 is a button for performing an instruction to cancel a process or an operation. By clicking on the OK button 83, the color measurement in the color measurement device 41 is completed, and a result of the measurement is stored in a storage medium (not illustrated) in the color measurement device 100.

The display switching button 85 is a button for performing an instruction to switch a display aspect for the image that is displayed in the image display field 80, similar to the display switching button 30 of the first embodiment (see FIG. 3).

Figure 23:
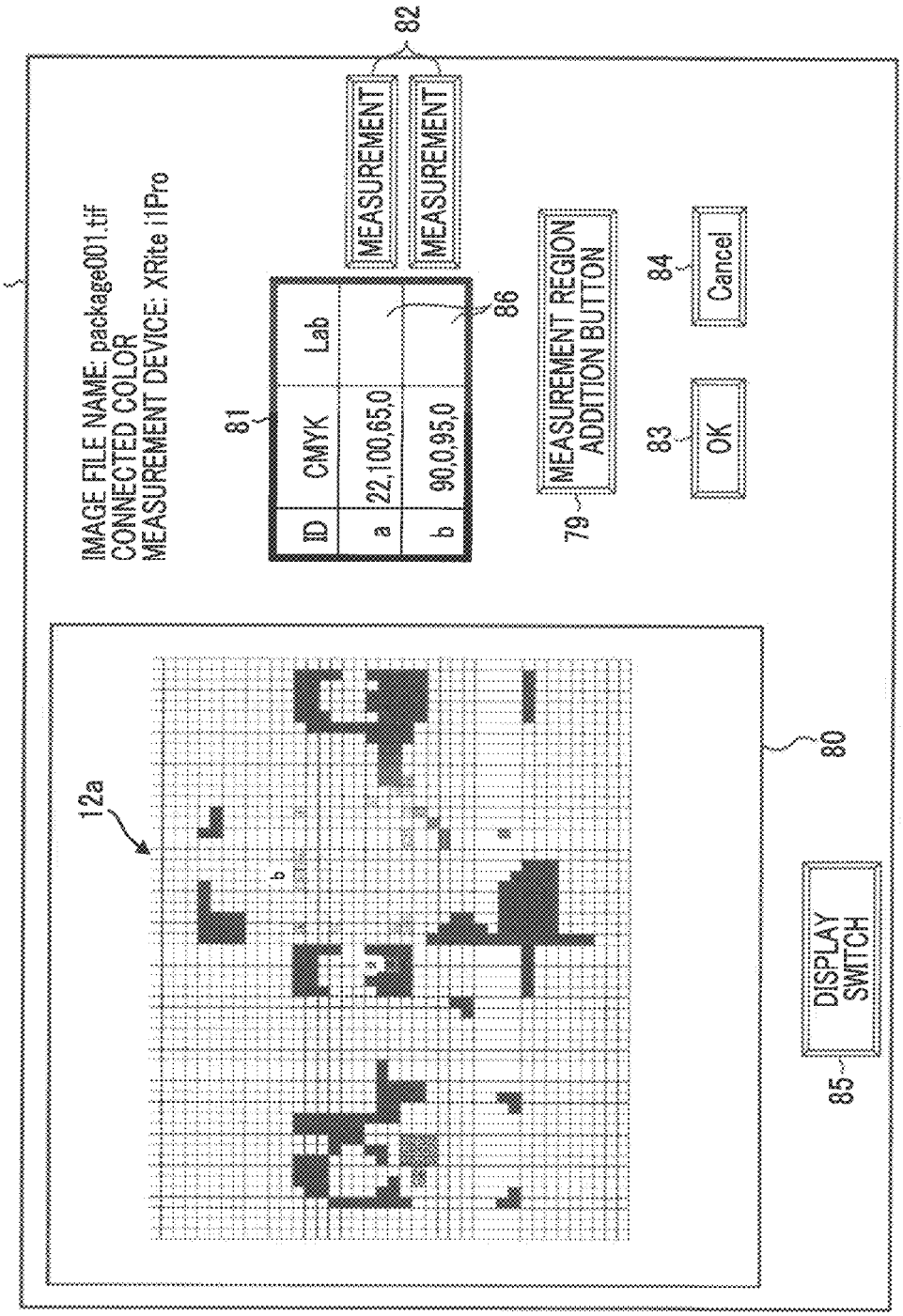
FIG. 23 is an illustrative diagram illustrating another display aspect of an image displayed in an image display field in FIG. 22.

FIG. 23 is an illustrative diagram illustrating another display aspect of the image displayed in the image display field 80. As illustrated in FIG. 23, when the display switching button 85 is clicked, the display unit 44 analyzes the print image data 12 to detect the above-described screen tint region, and displays a screen tint region image 12a based on a result of the detection in the image display field 80. Here, the screen tint region is not limited to the region in which image signal value is uniform, and may include a region that is in the above-described range of allowable value.

<Determination Process (Error Check) in Determination Unit>

Referring back to FIG. 20, the determination unit 45 of the sixth embodiment performs a determination as to whether the color measurement (measurement) has been correctly performed by the color measurement device 41 on the basis of the image signal value obtained from the print image data 12 and the color measurement value of the measurement region 31 measured by the color measurement device 41, similar to the determination unit 45 of the first embodiment (see FIG. 7).

The display unit 44 performs a warning display (a display on the display unit 44 or an audio display using a speaker or the like) indicating that the determination unit 45 determines "NG" in a case where the determination unit 45 determines "NG". Thus, it is possible to prompt the operator to perform the color measurement again.

[Operation of Sixth Embodiment]

Figure 24:
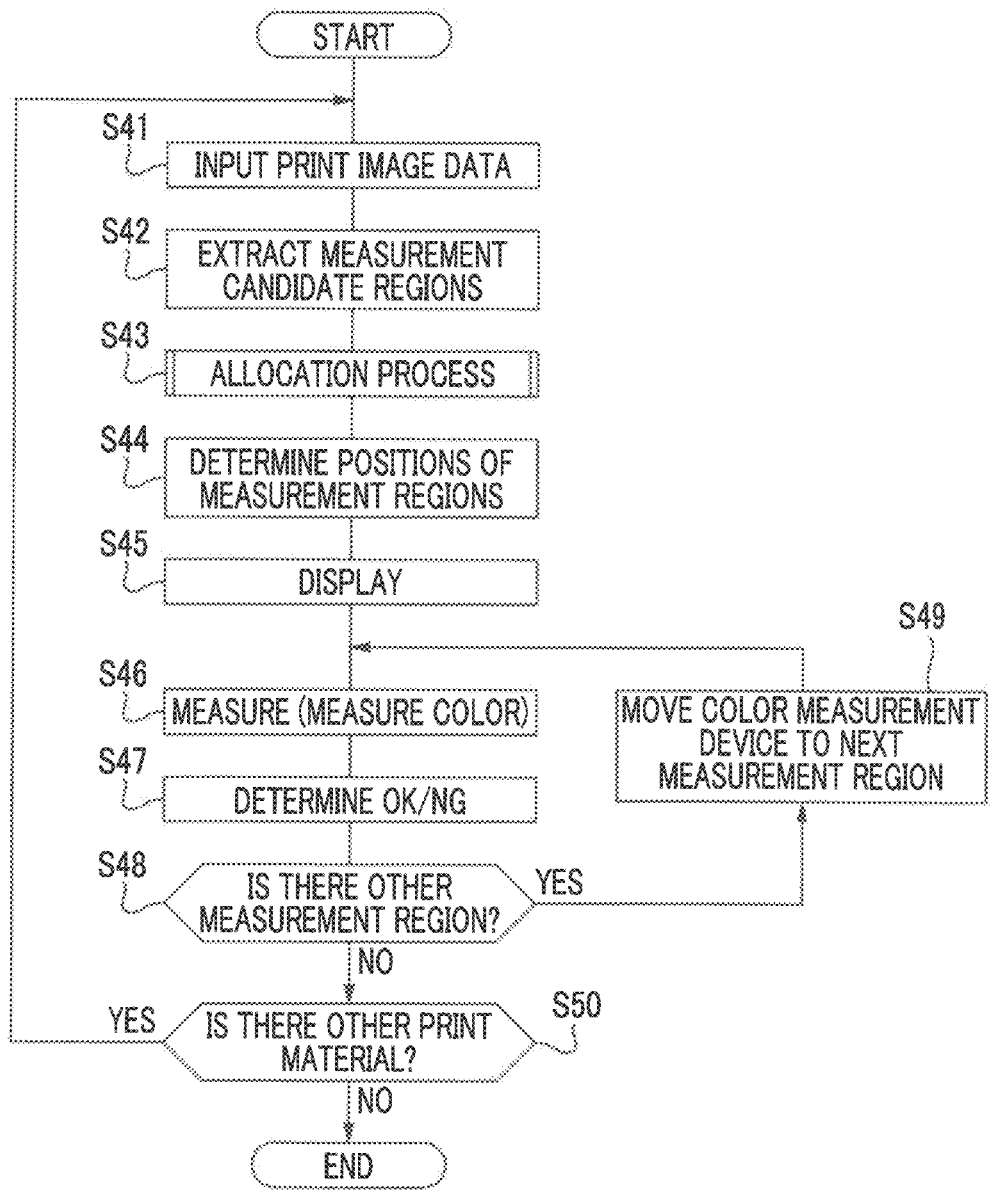
FIG. 24 is a flowchart illustrating a flow of a color measurement process for a print material in a color measurement device of the sixth embodiment, and particularly, a flow of a process of determining a measurement region that is a measurement position of a print material.

Next, an operation of the color measurement device 100 having the above configuration will be described with reference to FIG. 24. FIG. 24 is a flowchart illustrating a flow of a color measurement process for the print material 14 in the color measurement device 100 (method of measuring a print material for achieving the second object of the present invention) and, particularly, a flow of a process of determining the measurement region 31 that is a measurement position of the print material 14 (method of determining a measurement position of a print material for achieving the second object of the present invention).

First, the print image data 12 of the image printed on the print material 14 is input to the color measurement device 100 (step S41). The measurement region determination unit 52 acquires the print image data 12 input to the color measurement device 100.

If the measurement region determination unit 52 acquires the print image data 12, the extraction unit 55, the allocation unit 56, and the determination unit 57 of the measurement region determination unit 52 operate. The extraction unit 55 performs extraction of an image signal value at each position to scan the entire region of the print image data 12 while moving the position of the region of interest 60 on the print image data 12, as described with reference to FIGS. 14 and 15 described above. Thus, a plurality of measurement candidate regions 54 are extracted from the print image data 12 by the extraction unit 55 (step S42; corresponding to a measurement candidate region extraction step of the present invention). The extraction unit 55 outputs a result of the extraction of the measurement candidate region 54 to the allocation unit 56.

The allocation unit 56 performs an allocation process of determining the number of allocations of measurement regions 31 to each measurement candidate region group, as described with reference to FIG. 16 described above, on the basis of a result of the extraction of the measurement candidate region 54 input from the extraction unit 55 (step S43; corresponding to an allocation step of the present invention). Accordingly, the number of allocations of the measurement regions 31 sequentially from the measurement candidate region group with a high area proportion is determined by the allocation unit 56, but the measurement region candidate group of which the image signal value is similar to the measurement candidate region group to which the measurement region 31 has already been allocated is excluded from a target of allocation of the measurement region 31.

Even in a case where there are a large number of measurement candidate region groups of which the image signal values are similar, the image signal values of the measurement regions 31 are dispersed while allocating the measurement regions 31 to each measurement candidate region group with weights according to the area proportion by performing the process of allocating the measurement regions 31. As a result, significant imbalance is prevented from occurring in the number of measurement regions 31 to be allocated to each measurement candidate region group of which image signal values are different (are not similar). The allocation unit 56 outputs a result of the allocation of the measurement regions 31 to each measurement candidate region group to the determination unit 57.

The determination unit 57 determines the positions of the measurement regions 31 corresponding to the number of allocations to the measurement candidate region group by the allocation unit 56; as described with reference to FIG. 17 described above (step S44; corresponding to a determination step of the present invention). Accordingly, the positions of the measurement regions 31 in the measurement candidate region group are determined so that the positions of the respective measurement regions 31 are dispersed on the print material 14 by the determination unit 57. As a result, even in a case where there is unevenness in a surface of the print material 14, it is possible to acquire the color measurement value obtained by averaging an influence of the unevenness.

Then, the determination unit 57 performs a process of adding frame information capable of specifying the position of the determined measurement region 31, the measurement region information 33 (for example, ID) indicating the measurement region 31 to the print image data 12 on the print image data 12. The determination unit 57 outputs the processed print image data 12 to the display unit 44 and the determination unit 45.

The display unit 44 displays a GUI for a color measurement operation on the basis of the processed print image data 12 input from the determination unit 57 (step S45). The image corresponding to the print material 14, the frame information, and the measurement region information 33 (ID) are superimposed and displayed in the image display field 80 of the GUI on the basis of the print image data 12. Thus, it is possible to present the measurement region 31 on the print material 14 to the operator (corresponding to a presentation step of the present invention).

If a GUI for a color measurement operation is displayed on the display unit 44, the operator causes the color measurement device 41 to come in contact with the measurement region 31 (ID="a") of the print material 14 while confirming the image in the image display field 80, the frame information, and the measurement region information 33. Then, if the operator clicks on the measurement button 82 on the GUI, the color measurement of the measurement regions 31 in the color measurement device 41 (step S46) and the determination in the determination unit 45 (step S47) are executed, similar to the first embodiment (see steps S14 and S15 in FIG. 10).

In a case where an OK determination is made by the determination unit 45, the operator causes the color measurement device 41 to come in contact with the next measurement region 31 (ID="b") of the print material 14 (YES in step S48, the step S49). Hereinafter, similarly, each of the processes of step S46 to step S49 described above is repeatedly executed for each of the measurement regions 31 of the print material 14. If the color measurement of all of the measurement regions 31 of the print material 14 is completed (NO in step S48), the color measurement of the print material 14 is completed.

In a case where color measurement for another print material 14 is performed, each of the processes of step S41 to step S49 described above is repeatedly executed (step S50). The color measurement process for the print material 14 in the color measurement device 100 is completed.

[Effects of Sixth Embodiment]

As described above, in this embodiment, even in a case where there are a large number of measurement candidate region groups of which image signal values are similar in the print image data 12, the image signal value of the measurement region 31 is dispersed while allocating the measurement regions 31 to each measurement candidate region group with a weight according to the area proportion. As a result, it is possible to prevent for the number of measurement regions 31 (measurement positions) to be allocated to the measurement candidate region group having a low area proportion, but having an important color in the print image data 12 from being reduced or from being not allocated. As a result, it is possible to appropriately determine the measurement position on the print material.

Further, it is possible to easily and appropriately show the measurement positions on the print material to the operator without using a special device by displaying a result of the determination of the measurement position. As a result, it is possible to perform measurement with good reproducibility.

Further, since the measurement position is displayed even in a case where the color measurement of the gradation region within the image printed on the prim material 14 is performed, a deviation of the color measurement value caused by the position deviation of the measurement position is prevented from occurring.

Further, since the measurement position can be set as substantially the same positions when the color measurement of two print materials 14 is performed for the purpose of evaluation of color deviation between the two print materials 14, a deviation of the color measurement value caused by the deviation of the measurement position can be prevented. As a result, it is possible to evaluate the color deviation between the two print material 14 due to unevenness of printing. That is, it is possible to apply this embodiment to the evaluation of the color deviation among a plurality of print materials 14.

[Color Measurement Device of Seventh Embodiment]

Figure 25:
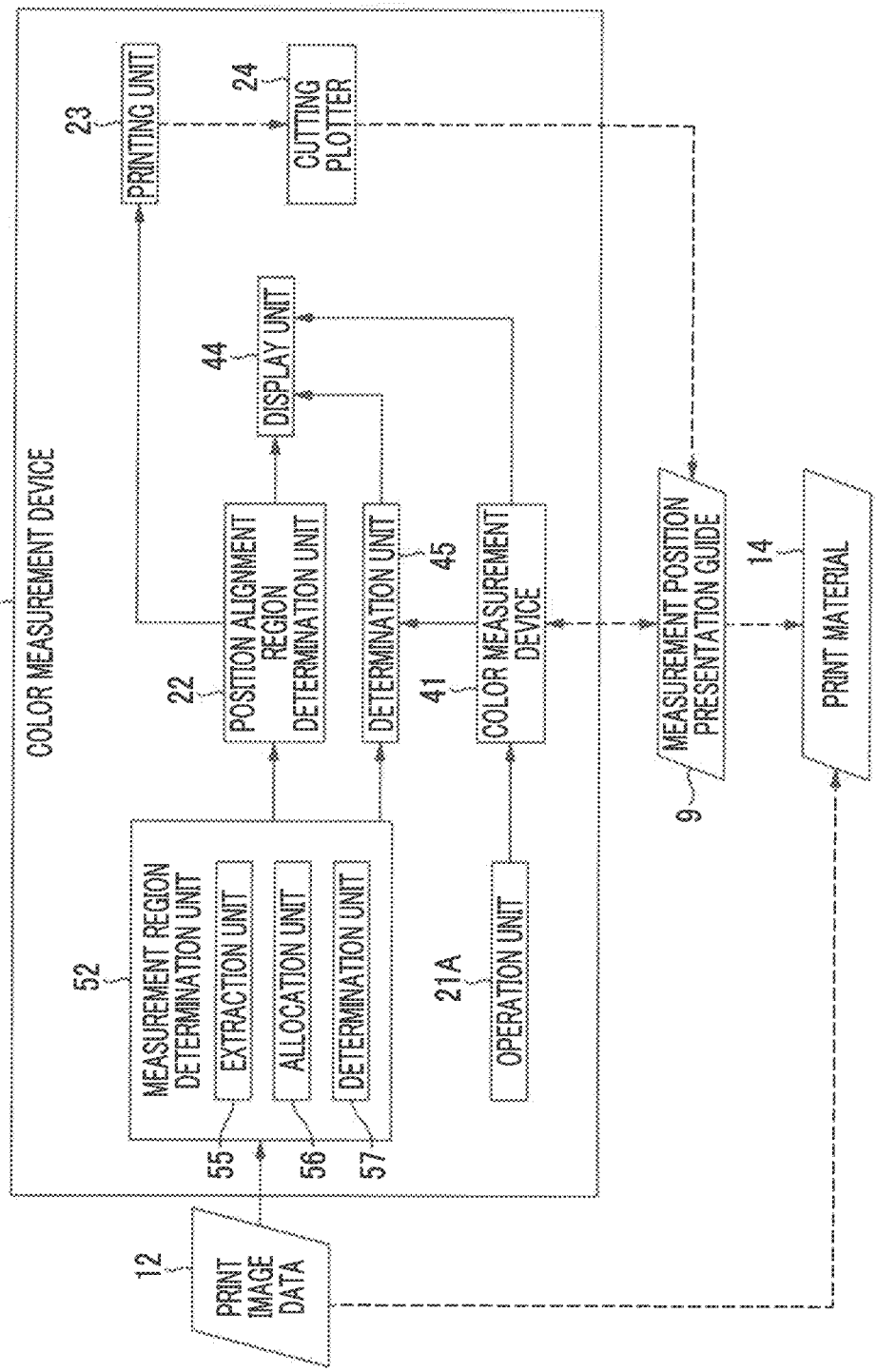
FIG. 25 is a schematic diagram of a color measurement device of a seventh embodiment.

Next, a color measurement device 100A of the seventh embodiment (corresponding to a device for presenting a measurement position of a print material for achieving the second object of the present invention) will be described with reference to FIG. 25. FIG. 25 is a schematic diagram of the color measurement device 100A of the second embodiment. The color measurement device 100 of the sixth embodiment presents the measurement region 31 on the print material 14 to the operator by displaying the measurement region 31 on the display unit 44. Accordingly, in the color measurement device 100A of the seventh embodiment, the measurement position presentation guide 9 indicating the measurement region 31 of the print material 14 is manufactured, as in the fourth embodiment, and the measurement region 31 on the print material 14 is presented to the operator using the measurement position presentation guide 9.

The color measurement device 100A has basically the same configuration as the color measurement device 100 of the sixth embodiment except that the color measurement device 100A includes a position alignment region determination unit 22, a printing unit 23, and a cutting plotter 24. Therefore, units of which functions and configurations are same as those in each embodiment are denoted with the same reference numerals and description thereof will be omitted.

The measurement region determination unit 52 of the seventh embodiment outputs the print image data 12 subjected to the process of adding the frame information and the measurement region information 33 to the position alignment region determination unit 22, and outputs the measurement region information 33 to the cutting plotter 24.

The position alignment region determination unit 22 of the seventh embodiment is a basically the same as the position alignment region determination unit 22 (see FIG. 1) described in the first embodiment and performs the process of analyzing the print image data 12 input from the measurement region determination unit 52 to detect the position alignment region 35 (see FIG. 4), and adding information capable of specifying the position alignment region 35 to the print image data 12. Further, the position alignment region determination unit 22 outputs the position alignment region information on the position and the shape of the position alignment region 35 to the cutting plotter 24.

The printing unit 23 of the seventh embodiment is basically the same as the printing unit 23 described in the first embodiment (see FIG. 1), and the image based on the print image data 12 input from the position alignment region determination unit 22 is printed on the above-described recording medium 37 (see FIG. 6). The recording medium 37 on which the image has been printed is set in the cutting plotter 24.

The cutting plotter 24 of the seventh embodiment is a basically the same as the cutting plotter 24 described in the first embodiment (see FIG. 1), and the process of cutting out a portion (cutout line) corresponding to the measurement region 31 and the position alignment region 35 from the recording medium 37 is performed to generate the measurement position presentation guide 9 (see FIG. 6). The portion (cutout line) corresponding to the measurement region 31 and the position alignment region 35 may be cut manually using a cutter or the like.

The measurement position presentation guide 9 of the seventh embodiment is basically the same as the measurement position presentation guide 9 (see FIGS. 6 and 7) described the first embodiment, and presents the measurement region 31 on the print material 14 to the operator when the measurement position presentation guide 9 is arranged on the print material 14. Thus, the operator can cause the color measurement device 41 to come in contact (close contact) with the measurement region 31 that is a measurement position of the print material 14 through the measurement position presentation guide 9 to thereby perform the color measurement. Since subsequent processes are basically the same as in the sixth embodiment described above, specific description thereof is omitted.

Thus, in the seventh embodiment, since it is possible to easily present the measurement region 31 on the print material 14 by manufacturing the measurement position presentation guide 9 indicating the measurement region 31 (measurement position) of the print material 14 and arranging the measurement position presentation guide 9 on the print material 14, the same effects as those described in the fourth embodiment and the sixth embodiment can be obtained.

[Other Examples of Seventh Embodiment]

Any one of the measurement position presentation guide 9A described in the second embodiment (see FIG. 11), the measurement position presentation guide 9B described in the third embodiment (see FIG. 12), and the above-described measurement position presentation guide 9C that a modification example of the measurement position presentation guide 9B (see FIG. 19) may be used instead of using the measurement position presentation guide 9 described in the seventh embodiment. Each measurement region 31 of the print material 14 can be presented to the operator even when any one of the measurement position presentation guides 9A, 9B, and 9C is used.

Further, the image size adjustment unit 72 described in the fifth embodiment (see FIG. 18) may be provided between the position alignment region determination unit 22 and the printing unit 23 in the seventh embodiment illustrated in FIG. 25. FIG. 26 is a schematic diagram of a color measurement device 100B of another example of the seventh embodiment including the image size adjustment unit 72.

As illustrated in FIG. 26, the color measurement device 100B has basically the same configuration of the color measurement device 100A of the seventh embodiment except that the image size adjustment unit 72 is provided between the position alignment region determination unit 22 and the printing unit 23, and a scanner 74 is connected to the image size adjustment unit 72 (see FIG. 18). Therefore, units of which functions and configurations are same as those in each embodiment are denoted with the same reference numerals and description thereof will be omitted.

The image size adjustment unit 72 is basically the same as the image size adjustment unit 72 described in the fifth embodiment (see FIG. 18), and adjusts the size of the image of the print image data 12 input from the position alignment region determination unit 22 according to the size of the image printed on the print material 14 on the basis of the print image data 12. Since a specific adjustment method is the same as that in the fifth embodiment described above, description thereof is omitted herein. Thus, as described in the fifth embodiment, the measurement position presentation guide 9 on which the image having the size corresponding to the size of the image on the print material 14 has been printed can be obtained.

At the time of the manufacture of the measurement position presentation guide 9, in a case where the size of the print image data 12 and the size of the image printed on the recording medium 37 do not match, a scaling process in the image size adjustment unit 72 may be executed in consideration of a scaling factor obtained by comparing both of the sizes, as in the time of printing of the print material 14.

Further, the scaling process may be performed on the print image data 12 before the print image data 12 is input to the color measurement device 100B instead of performing the scaling process on the print image data 12 input from the position alignment region determination unit 22, and a timing for performing the scaling process is not particularly limited. Further, the scaling process for the print image data 12 may be applied at the time of manufacture of the measurement position presentation guide of another example of the seventh embodiment described above.

[Others]

Although the allocation unit 56 determines the number of allocations of the measurement regions 31 in an order from the measurement candidate region group having a high area proportion in the fourth embodiment (the second allocation processing method for the number of measurement regions), the sixth embodiment, and the seventh embodiment (including other example), this order is not particularly limited. For example, the number of allocations of the measurement regions 31 may be determined in an order of measurement candidate regions including a large amount of predetermined important colors, an order of the measurement candidate region groups close to a center of the print image data, or an order of randomly determined measurement candidate region groups.

Although the example of the color measurement (that is, color measurement of spectral reflectance, spectral transmittance, XYZ value, Lab value, concentration, or the like) for the measurement of the quality of the print material 14 has been described in each embodiment, an application scope of the present invention is not limited to the color measurement, and the present invention is applicable to measurement of things other than color, such as measurement of a halftone dot area rate, a degree of glossiness, or measurement of a bidirectional reflectance distribution function (BRDF) (a case where the measurement region 31 of the print material 14 is exposed from an aperture of the measurement position presentation guide).

Although the image based on the print image data (including the edge image) has been printed on the measurement position presentation guide in each embodiment described above, printing of the image may be omitted as long as the position of the measurement region 31 (the measurement region information 33 or the position alignment region 35) can be shown.

Further, the present invention is not limited to the embodiments described above, and it is understood that various modifications can be made without departing from the spirit of the present invention. For example, at least two of the above embodiments may be appropriately combined.

EXPLANATION OF REFERENCES 9, 9A, 9B, 9C: measurement position presentation guide
10: guide manufacturing device
12: print image data
14: print material
16: color measurement device
20: measurement region determination unit
22: position alignment region determination unit
23: printing unit
24: cutting plotter
31: measurement region
33: measurement region information
35: position alignment region
41: color measurement device
52: measurement region determination unit
55: extraction unit
56: allocation unit
57: determination unit
100, 100A, 100B: color measurement device

What is claimed is:

1. A method of manufacturing a measurement position presentation guide, the method comprising:
a determination step of determining a measurement position for measuring quality of a print material on which an image based on print image data is printed, in advance; and
a generation step of generating a measurement position presentation guide indicating the measurement position of the print material on the basis of the print image data,
wherein the generation step includes generating the measurement position presentation guide including a printing surface on which the image is printed and a measurement region formed on the printing surface and indicating a measurement position,
wherein the generation step further includes forming an edge image obtained by extracting an edge of the image, on the printing surface, and
wherein the generation step includes comparing a size of the image of the print image data with a size of the image printed on the print material on the basis of the print image data to calculate a scaling factor of the size of the image printed on the print material to the size of the image of the print image data, performing a scaling process of scaling the size of the image on the print image data on the basis of the scaling factor, and performing printing on the printing surface of the measurement position presentation guide on the basis of the print image data subjected to the scaling process.

2. A method of manufacturing a measurement position presentation guide, the method comprising:
a determination step of determining a measurement position for measuring quality of a print material on which an image based on print image data is printed, in advance;
a generation step of generating a measurement position presentation guide indicating the measurement position of the print material on the basis of the print image data,
wherein the generation step includes generating the measurement position presentation guide including a printing surface on which the image is printed and a measurement region formed on the printing surface and indicating a measurement position,
wherein the generation step further includes forming an edge image obtained by extracting an edge of the image, on the printing surface; and
a candidate region extraction step of analyzing the print image data to extract the plurality of measurement candidate regions that are candidates of the measurement position, image signal values in the plurality of measurement candidate regions being equal individually for the respective regions,
wherein the determination step includes determining the measurement position from among the plurality of measurement candidate regions extracted in the measurement candidate region extraction step, and
wherein in a case where a group of the measurement candidate regions of which the image signal values are equal is defined as one measurement candidate region group, the determination step includes determining the number of measurement positions to be allocated to the respective measurement candidate region groups according to an area proportion of each measurement candidate region group of which the image signal values are different, and determining the position of the measurement candidate region corresponding to the number to be allocated to each measurement candidate region group as the measurement position.

3. A method of manufacturing a measurement position presentation guide, the method comprising:
a determination step of determining a measurement position for measuring quality of a print material on which an image based on print image data is printed, in advance;

a generation step of generating a measurement position presentation guide indicating the measurement position of the print material on the basis of the print image data, wherein the generation step includes generating the measurement position presentation guide including a printing surface on which the image is printed and a measurement region formed on the printing surface and indicating a measurement position, wherein the generation step includes forming an edge image obtained by extracting an edge of the image, on the printing surface;

a candidate region extraction step of analyzing the print image data to extract the plurality of measurement candidate regions that are candidates of the measurement position, image signal values in the plurality of measurement candidate regions being equal individually for the respective regions; and an allocation step of comparing magnitudes of area proportions of the respective measurement candidate regions of which the image signal values are different on the basis of a result of the extraction in the measurement candidate region extraction step to determine the number of measurement positions to be allocated to the respective measurement candidate region groups in an order of the magnitudes of the area proportions in a case where a group of the measurement candidate regions of which the image signal values are equal is defined as one measurement candidate region group, wherein the allocation step includes excluding the measurement candidate region group of which the image signal value is within a predetermined range with respect to the image signal value of the measurement candidate region group to which the measurement position has been allocated, from targets of allocation of the measurement position, and the determination step includes determining the position of the measurement candidate region corresponding to the number of allocations to each measurement candidate region group in the allocation step, as the measurement position.

4. The method of manufacturing a measurement position presentation guide according to claim 2, wherein the determination step includes dispersing measurement positions in the measurement candidate region group when a plurality of measurement positions are determined in the measurement candidate region group.

5. The method of manufacturing a measurement position presentation guide according to claim 4, wherein the determination step includes increasing dispersion of the measurement positions in a predetermined direction in the print material than that in other directions when the measurement positions are dispersed.

6. A method of determining a measurement position of a print material, the method comprising:

a candidate region extraction step of analyzing the print image data of the image to be printed on the print material to extract a plurality of measurement candidate regions that are candidates of the measurement position for measuring quality of the print material, image signal values in the plurality of measurement candidate regions being equal individually for the respective regions;

an allocation step of determining, for each measurement candidate region group, the number of measurement positions to be allocated to each of the plurality of measurement candidate region groups of which image signal values are different on the basis of a result of the extraction in the measurement candidate region extraction step in a case where a group of the measurement candidate regions having the same image signal value is defined as one measurement candidate region group; and a determination step of determining the position of the measurement candidate region corresponding to the number of allocations to each measurement candidate region group in the allocation step, as the measurement position, wherein the allocation step includes excluding the measurement candidate region group of which the image signal value is within a predetermined range with respect to the image signal value of the measurement candidate region group to which the measurement position has been allocated, from targets of allocation of the measurement position.

7. The method of determining a measurement position of a print material according to claim 6, wherein the allocation step includes comparing magnitudes of area proportions that are percentages in the print image data for each measurement candidate region group on the basis of a result of the extraction in the candidate region extraction step to determine the number of measurement positions to be allocated to the respective measurement candidate region groups in an order of the magnitudes of the area proportions.

8. The method of determining a measurement position of a print material according to claim 7, wherein the allocation step includes increasing the number of measurement positions to be allocated as the area proportion of the measurement candidate region group increases.

9. The method of determining a measurement position of a print material according to claim 6, wherein the determination step includes dispersing measurement positions in the measurement candidate region group when a plurality of measurement positions are determined in the measurement candidate region group.

10. The method of determining a measurement position of a print material according to claim 9, wherein the determination step includes increasing dispersion of the measurement positions in a predetermined direction in the print material than that in other directions when the measurement positions are dispersed.

11. The method of determining a measurement position of a print material according to claim 6, wherein the candidate region extraction step includes setting a region of interest in the print image data, and performing extraction of the measurement candidate region on the basis of a result of the extraction of the image signal value for each region of interest obtained by performing extraction of an image signal value in the region of interest from the print image data at each position while moving a position of the region of interest to scan an entire area of the print image data.

12. The method of determining a measurement position of a print material according to claim 11, wherein in the measurement candidate region extraction step, each position of the region of interest set in the print image data is set to a position at which the regions of interest do not overlap.

13. The method of determining a measurement position of a print material according to claim 11,
wherein in the measurement candidate region extraction step, each position of the region of interest set in the print image data is set to a position at which the regions of interest that are adjacent to each other partially overlap.

14. The method of determining a measurement position of a print material according to claim 6, further comprising:
a presentation step of presenting the measurement position of the print material determined in the determination step.

15. The method of determining a measurement position of a print material according to claim 14,
wherein the presentation step includes performing a process of adding information indicating the measurement position to the print image data, and displaying an image based on the print image data subjected to the process on a display unit.

16. The method of determining a measurement position of a print material according to claim 14,
wherein the presentation step includes generating a measurement position presentation guide indicating the measurement position of the print material on the basis of the print image data, and arranging the measurement position presentation guide on the print material to present the measurement position.

17. The method of determining a measurement position of a print material according to claim 6,
wherein the measurement of the quality of the print material includes at least one of color measurement of the print material, measurement of a halftone dot area rate of the image printed on the print material, measurement of a degree of glossiness of the print material, or measurement of a bidirectional reflectance distribution function of the print material.

18. A method of measuring a print material, the method comprising:
measuring quality of the print material at a measurement position determined using the method of determining the measurement position of a print material according to claim 6.

19. A device for determining a measurement position of a print material, the device comprising:
a candidate region extraction unit that analyzes print image data of an image to be printed on the print material to extract a plurality of measurement candidate regions that are candidates of a measurement position for measuring quality of the print material, image signal values in the plurality of measurement candidate regions being equal individually for the respective regions;
an allocation unit that determines, for each measurement candidate region group, the number of measurement positions to be allocated to each of the plurality of measurement candidate region groups of which image signal values are different on the basis of a result of the extraction in the measurement candidate region extraction unit in a case where a group of the measurement candidate regions of which the image signal values are the same is defined as one measurement candidate region group; and
a determination unit that determines the position of the measurement candidate region corresponding to the number of allocations to each measurement candidate region group in the allocation unit, as the measurement position,
wherein the allocation unit excludes the measurement candidate region group of which the image signal value is within a predetermined range with respect to the image signal value of the measurement candidate region group to which the measurement position has been allocated, from targets of allocation of the measurement position.

* * * * *